(12) United States Patent
Kojima

(10) Patent No.: US 8,060,746 B2
(45) Date of Patent: Nov. 15, 2011

(54) E-MAIL TRANSFER METHOD AND DEVICE

(75) Inventor: Yuji Kojima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1175 days.

(21) Appl. No.: 11/186,359

(22) Filed: Jul. 21, 2005

(65) Prior Publication Data

US 2006/0212703 A1 Sep. 21, 2006

(30) Foreign Application Priority Data

Mar. 18, 2005 (JP) .................................. 2005-080717

(51) Int. Cl.
 *H04L 9/32* (2006.01)
(52) U.S. Cl. ........ 713/175; 713/150; 713/155; 713/156; 713/157; 713/158; 713/159; 713/168; 709/225; 709/226; 709/229; 705/67
(58) Field of Classification Search .................. 713/150, 713/155–159, 168, 175, 201; 709/225, 226, 709/229; 705/67
See application file for complete search history.

(56) References Cited

U.S. PATENT DOCUMENTS

| | | | | |
|---|---|---|---|---|
| 6,760,752 | B1 * | 7/2004 | Liu et al. ........................ | 709/206 |
| 2002/0143885 | A1 * | 10/2002 | Ross, Jr. ........................ | 709/207 |
| 2004/0181586 | A1 * | 9/2004 | Morreale et al. .............. | 709/206 |
| 2005/0039012 | A1 * | 2/2005 | Ishibashi et al. .............. | 713/170 |
| 2006/0031315 | A1 * | 2/2006 | Fenton et al. ................. | 709/206 |

FOREIGN PATENT DOCUMENTS

| | | |
|---|---|---|
| JP | 2001-144745 | * 11/1999 |
| JP | 2001-134534 | 5/2001 |
| JP | 2001-144745 | 5/2001 |

OTHER PUBLICATIONS

William Stallings, "X.509 Public Key Certifiates", http://www.informit.com/articles/articles.aspx?p=22170, pp. 1-3, Jul. 2001.*
Notification of Reason(s) for Refusal dated Apr. 27, 2010 for corresponding Japanese Application No. 2005-080717.

* cited by examiner

*Primary Examiner* — Vivek Srivastava
*Assistant Examiner* — Hee Song
(74) *Attorney, Agent, or Firm* — Katten Muchin Rosenman LLP

(57) ABSTRACT

In a method and a device for transferring an e-mail by a public key cryptography between an e-mail transmission device and an e-mail reception device, a trigger message to which user authentication data and a public key are added is received from a transmitting side client, and trust is assigned to the public key within the trigger message to be transmitted to a receiving side client when the user authentication data within the trigger message are authenticated. In response thereto, a response message to which user authentication data and a public key are added is received from the receiving side client, and trust is assigned to the public key within the response message to be transmitted to the transmitting side client when the user authentication data within the response message are authenticated.

19 Claims, 21 Drawing Sheets

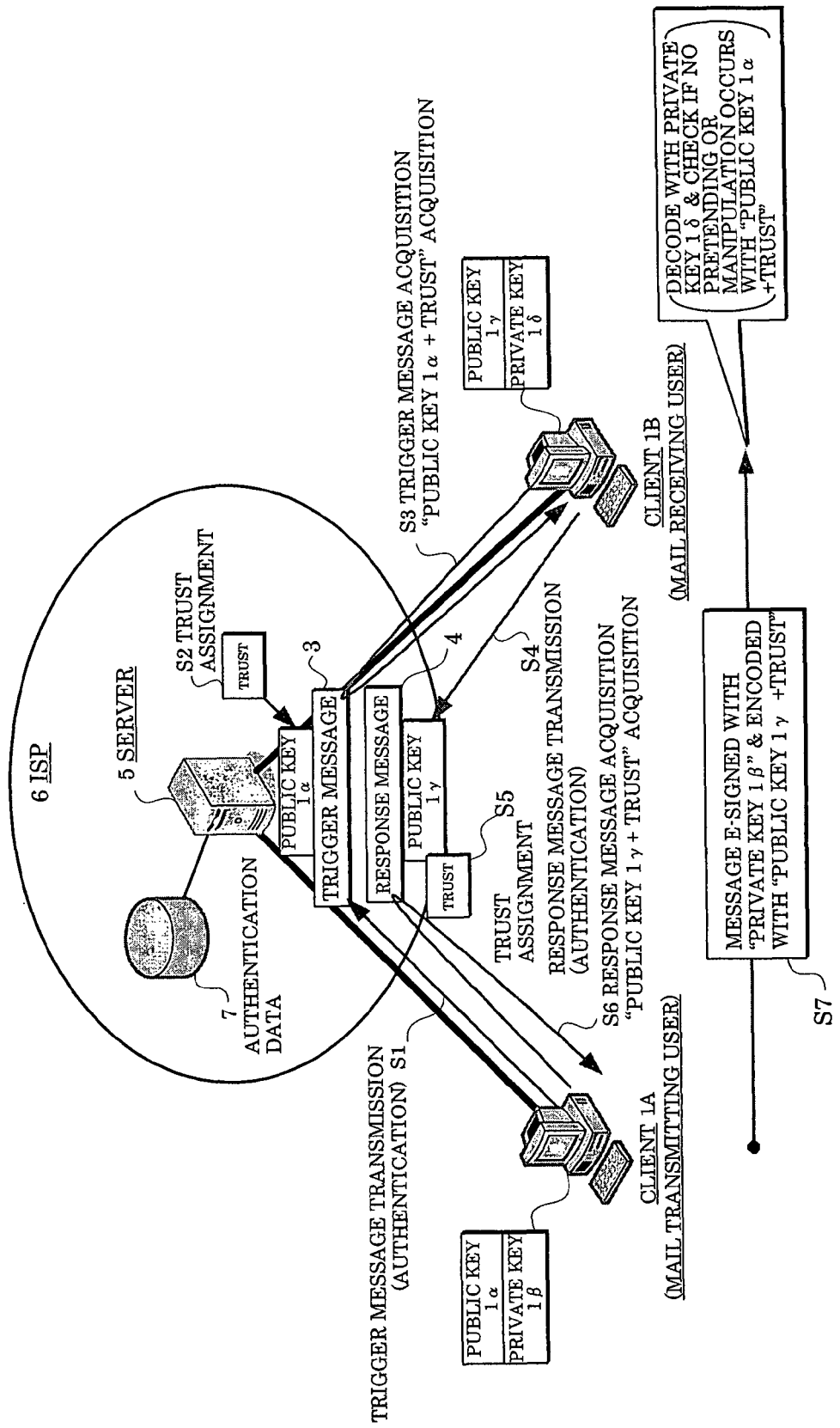

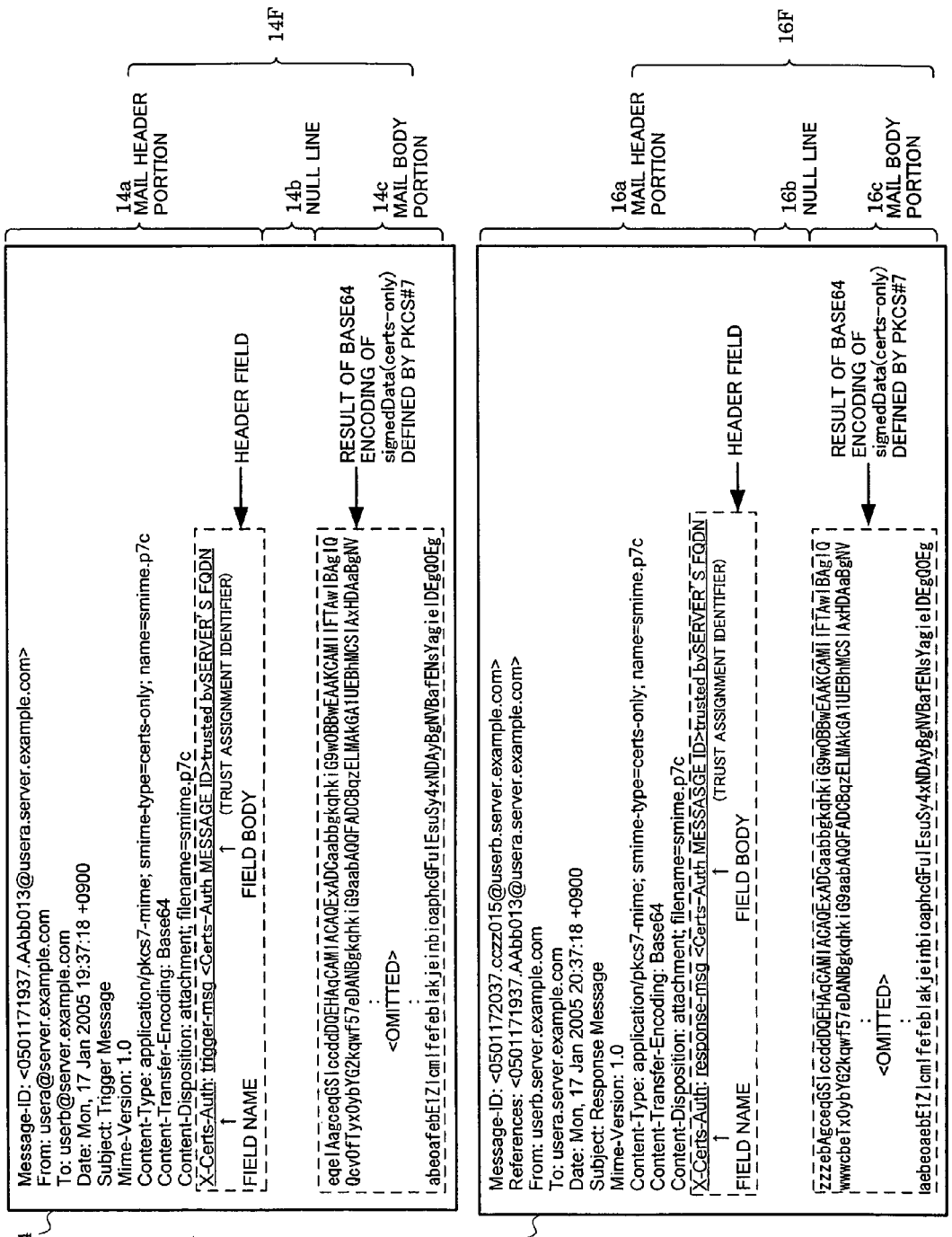

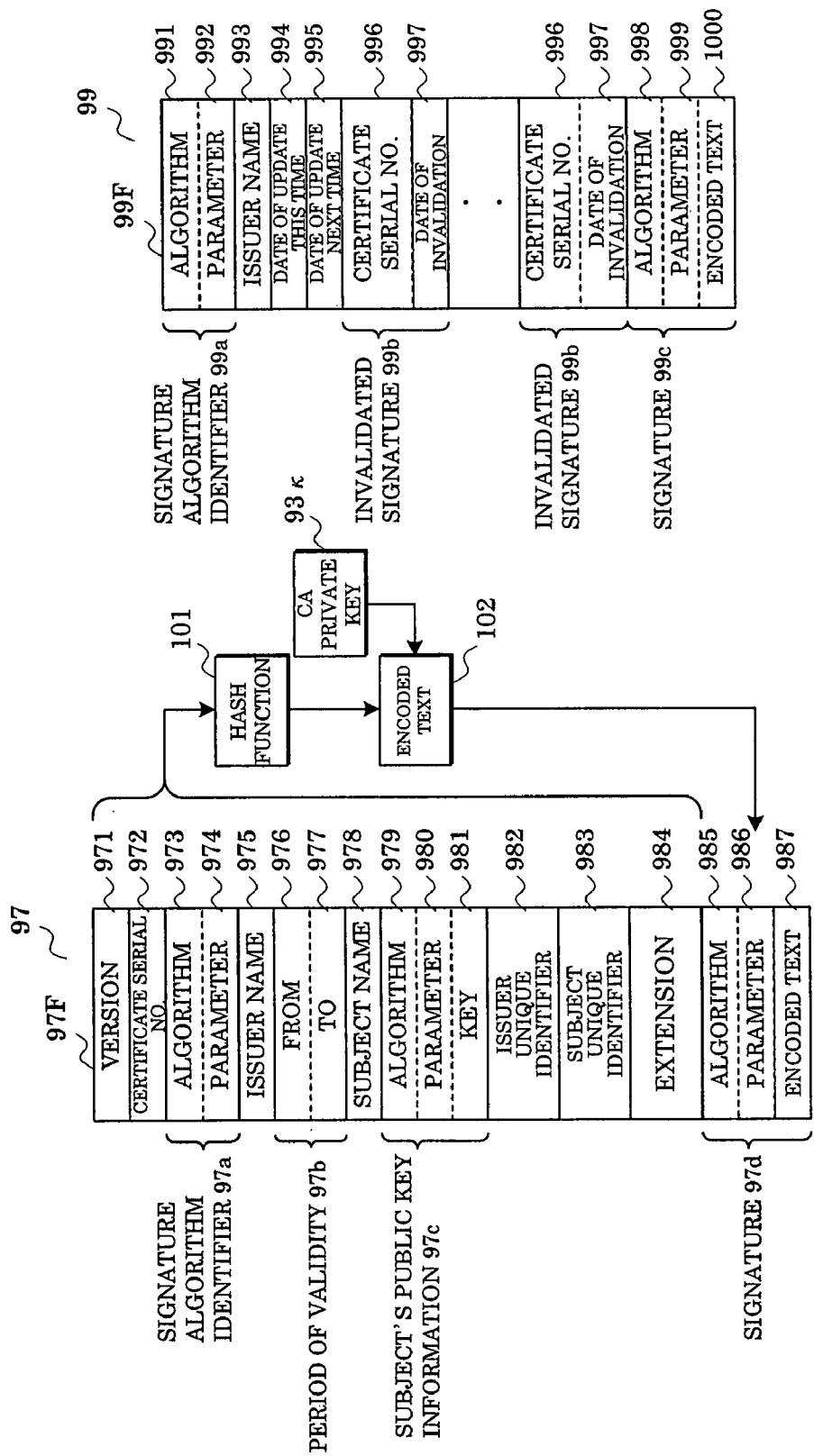

E-MAIL TRANSFER METHOD AND DEVICE

BACKGROUND OF THE INVENTION

1. Field of the Invention

The present invention relates to an e-mail transfer method and device, and in particular to an e-mail transfer method and device for transferring an e-mail by a public key cryptography between an e-mail transmission device and an e-mail reception device.

2. Description of the Related Art

As prior art methods of encoding plaintext of an e-mail on the Internet, a common key cryptography using a key common to encoding (also referred to as encrypting) and decoding (also referred to as decrypting) and a public key cryptography using keys different from each other for encoding and decoding have been known. Plaintext in this description indicates an e-mail message before being encoded.

In the above-mentioned common key cryptography, an e-mail transmission device (hereinafter, occasionally referred to as mail transmitting user or client) and an e-mail reception device (hereinafter, occasionally referred to as mail receiving user or client) preliminarily possess a common key, the mail transmitting user transmits to the mail receiving user encoded text (also referred to as ciphertext) that is plaintext encoded with the common key, and the mail receiving user decodes the encoded text with the common key. Thus, "information leakage" in the transmission process from the mail transmitting user to the mail receiving user can be prevented. However, it is difficult to place an e-signature for preventing an unauthorized third person from "pretending" (also referred to as "spoofing") and "manipulating" (also referred to as "falsification"), so that a safe distribution of the common key is required.

In order to counter the above-mentioned problem, the public key cryptography prepares a pair of different keys, so that the different keys are used for encoding and decoding respectively. One is made a public key released to a transmitting destination, and the other is made a private key (also referred to as a secret key) stored only by the transmitting side itself at hand. Encoded text (ciphertext) encoded with the public key can be decoded only with the private key which is one of the pair, and the encoded text encoded with the private key can be decoded only with the public key which is one of the pair. Also, as for the above-mentioned public key and the private key, it is mathematically difficult and actually impossible to prepare one key from the information of the other key.

Upon transmitting an encoded e-mail e.g. by the public key cryptography to the mail receiving user, the mail transmitting user encodes plaintext with the public key of the mail receiving user into the encoded text to be transmitted to the mail receiving user. The mail receiving user having received the e-mail can obtain the original plaintext by decoding the encoded text with its own private key. Therefore, even if an unauthorized third party taps the e-mail in the transmission process of the e-mail, the plaintext can not be obtained unless he/she has the private key for decoding. Accordingly, the leakage of the e-mail message to the unauthorized third party can be prevented.

Also, upon transmitting to the mail receiving user a mail e-signed by the public key cryptography, the mail transmitting user prepares a hash value (hereinafter, referred to as digest) by applying the plaintext to a certain hash function, and encodes the digest with the private key of the mail transmitting user to make an e-signature which is added to the plaintext, so that the e-mail is transmitted to the mail receiving user. The mail receiving user having received the mail with the e-signature decodes the e-signature with the public key of the mail transmitting user, and confirms whether or not the e-signature is coincident with the digest prepared from the plaintext independently.

It is to be noted that there is a possibility that the same digest can be obtained from two plaintexts logically different from each other when the digest is prepared from the plaintext as mentioned above. However, a probability of getting the same digest coincidentally from two plaintexts is actually extremely low. Also, it is impossible to prepare plaintext from a certain digest. Also, which can prepare the digest which can be decoded with the public key of the mail transmitting user is only the private key of the mail transmitting user.

Accordingly, when the comparison result of the above-mentioned digests provides a coincidence, the mail receiving user having received the e-mail recognizes that the e-mail is not transmitted by an unauthorized third party but is transmitted by the mail transmitting user undoubtedly, and further the contents are not manipulated in the process of the mail transmission.

Therefore, in the encoded and e-signed mail (hereinafter, occasionally referred to as "encoded/e-signed") by the public key cryptography, a threat on security ("pretending", "information leakage", "manipulation") is prevented. The e-mail can be safely transmitted/received to/from the opponent communicating device.

The procedure of transmitting/receiving the encoded/e-signed mail by the public key cryptography will now be described in detail referring to FIG. 19 (Internet security text <vol. 1>; publisher: IDG Japan; see page 217 of ISBN: 4872804759).

When a client (mail transmitting user) 91A transmits an encoded/e-signed mail to a client (mail receiving user) 91B, the mail transmitting user 91A prepares a digest (message digest) 92*c* by applying plaintext 92*a* to a message/digest function 92*b* (at step S91). The mail transmitting user 91A encodes the digest 92*c* with its own private key 91β to obtain an e-signature 92*d* (at step S92).

The mail transmitting user 91A further encodes the plaintext (message) 92*a* and the e-signature 92*d* with a common key 91ε to prepare encoded text 92*e* (at step S93), and encodes the common key 91ε with a public key 91γ of the mail receiving user 91B to prepare a common key 91 ζ (at step S94).

The mail transmitting user 91A adds the common key 91 ζ to the encoded text 92*e* to prepare an e-mail 92*g* (at step S95) to be transmitted to the mail receiving user 91B.

On the other hand, the mail receiving user 91B having received the e-mail 92*g* decodes the encoded common key 91 ζ into the common key 91ε with its own private key 91δ (at step S96), and decodes the encoded text 92*e* into the plaintext 92*a* and the e-signature 92*d* with the common key 91ε (at step S97).

The mail receiving user 91B applies the plaintext 92*a* to the above-mentioned message/digest function 92*b* to prepare a digest 92*c*1 (at step S98), decodes the e-signature 92*d* into a digest 92*c*2 with the public key 91α of the mail transmitting user 91A (at step S99), and verifies whether or not the digest 92*c*1 is the same as the decoded digest 92*c*2 by comparing both digests (at step S100).

It is to be noted that in the above-mentioned description, the mail transmitting user 91A does not directly encode the plaintext 92*a* with the public key 91γ of the mail receiving user 91B, but prepares the temporary common key 91ε for transmitting the e-mail, encodes the plaintext with the common key 91ε, and includes the common key 91ε encoded with the public key of the mail receiving user 91B in the e-mail to be transmitted to the mail receiving user 91B.

In the encoding/decoding by the public key cryptography, processing load is heavier compared with that by the common key cryptography, and requires much time. Therefore, the entire long plaintext is not encoded by the public key cryptography, but the above-mentioned common key 91ε is encoded with the public key 91γ of the mail receiving user 91B, so that speed enhancement of processing is achieved. It is not different from the encoding with the public key 91γ of the mail receiving user 91B substantially.

It is to be noted that the above-mentioned encoded/e-signed mail is prepared by combining the encoding of the plaintext with an addition of an e-signature, e.g. by encoding the plaintext to which the e-signature is added. Accordingly, the encoded e-mail or the e-signed mail can be prepared as a sub-set of the encoded/e-signed mail.

In order to prepare the encoded/e-signed mail by the public key cryptography, the mail transmitting/receiving user is required to preliminarily obtain the public key of the opponent user and to confirm authenticity of the public key obtained and its owner.

However, anyone can prepare a pair of public key and private key, wherein there is a possibility that an unauthorized third party pretends to be an authorized mail transmitting/receiving user to release the public key. In order to counter this, a certification authority becomes necessary which manages a public key used in an electronic commerce or the like on a neutral ground as a reliable third party organization, which issues a certificate in which a signature of the certification authority itself is added to a requested public key, and which guarantees the authenticity of the public key and its owner.

Thus, it becomes possible for the mail transmitting/receiving user to register the public key and to have the certification authority issue the public key certificate in which the public key and various attributes such as names, belonging organizations and e-mail addresses are described. By the public key certificate issued from the certification authority, the mail transmitting/receiving user can confirm the authenticated public key and public key certificate of the opponent user.

It is to be noted that the entire infrastructure including the certification authority, the public key encoding technology, the public key certificate, the functions realized thereby, etc. is called PKI (Public Key Infrastructure).

As mentioned above, in order to transmit/receive the encoded/e-signed mail, the mail transmitting/receiving user is required to preliminarily acquire its own public key certificate from the certification authority and to acquire the public key certificate of the opponent user.

When the encoded/e-signed mail is transmitted/received, the mail transmitting/receiving user is required to use its own private key and the public key of the opponent user.

It is to be noted that when the mail transmitting/receiving user transmits/receives the encoded mail, the mail receiving user preliminarily acquires the public key certificate from the certification authority, and the mail transmitting user has only to acquire the public key certificate. Also, when the mail transmitting/receiving user transmits/receives the e-signed mail, the mail transmitting user preliminarily acquires the public key certificate from the certification authority and the mail receiving user has only to acquire the public key certificate.

Such a certification authority, a public key certificate and a certificate revocation list will now be specifically described referring to FIGS. 20, 21A and 21B.

FIG. 20 shows a process in which a certification authority (CA) 93 issues a public key certificate, and the mail transmitting/receiving user transmits/receives an encoded/e-signed mail. FIGS. 21A and 21B show a format 97F of a public key certificate and a format 99F of a certificate revocation list. These are formats (X.509 Version 3) prescribed by the ITU (International Telecommunications Union) and are generally and frequently used. It is to be noted that the certificate revocation list will be described later.

In FIG. 20, the certification authority 93 issues a public key certificate 97 at the request of a person or an organization (client 91C) receiving the issue of the public key certificate 97. The certification authority 93 has a server (referred to as repository) 94 for releasing the public key certificate 97. The certification authority 93 and a certification authority 95 have a relationship of mutual authentication. When the person or the organization having the certification authority 93 issue the public key certificate 97 files an application of the issue (at step S101), the certification authority 93 issues the public key certificate 97 according to the application (at step S102).

The certification authority 93 releases the public key certificate 97 issued by a repository 94 to an indefinite number of persons (at step S103).

Thus, when the public key certificate 97 is issued to the mail transmitting user (client) 91A and the mail receiving user (client) 91B respectively from the certification authority 93, the mail transmitting user 91A and the mail receiving user 91B respectively acquire the public key 91γ and the public key 91α of the opponent user. For example, the mail transmitting user 91A retrieves the repository 94 with the user name of the mail receiving user 91B to acquire the public key 91γ (at step S105), or acquires the public key 91γ from the mail receiving user 91B (see arrow Y). Similarly, the mail receiving user 91B retrieves the repository 94 with the user name of the mail transmitting user 91A to acquire the public key 91α (at step S106) or acquires the public key 91α from the mail transmitting user 91A (see arrow X).

When each of the mail transmitting/receiving users 91A and 91B respectively obtains the public key of the opponent user, the mail transmitting user 91A can transmit an encoded and e-signed e-mail to the mail receiving user 91B by the public key cryptography.

It is to be noted that the certification authority 93 accepts the application of the public key certificate 97 by electronic means, by postal mails or by applicant's visit, as required according to the level of the trust (reliance or confidence) of the public key certificate 97, and also requires attachment of another certificate such as a residence certificate, a copy of register, and a certificate of seal.

When the public key certificate 97 is used in e.g. an electronic commerce or the like between enterprises with giving/receiving a great amount of money, the public key certificate 97 with higher level of trust is required.

The certification authority 93 examines the application of the applicant, issues the public key certificate 97 according to its level, and manages the issued public key certificate 97.

Also, the certification authority 93 releases the issued public key certificate 97 to an indefinite number of persons at the repository 94 and also releases a certificate revocation list and a root certificate (described later). It is to be noted that an LDAP (Lightweight Directory Access Protocol) in FIG. 20 is generally a protocol most frequently used for accessing the repository 94.

Also, when the certification authority 93 and the certification authority 95 have a relationship of mutual authentication, the transmitting/receiving user having registered the public key certificate 97 in a single certification authority 93 can transmit/receive the encoded/e-signed mail between the certification authorities 93 and 95.

The functions of the certification authority 93 are as follows:

Definition of Function in Certification Authority (1) Acceptance of public key certificate application According to the level of the trust of the certificate, the application is accepted by electronic means, by postal mails or by applicant's visit, with the attachment of another certificate such as a residence certificate, a copy of register, and a certificate of seal.

Examination function according to the level of the trust of the certificate.

(2) Issue of public key certificate (3) Management of public key certificate (4) Release of public key certificate Management (LDAP) of repository (server releasing required information (certificate, CRL and root certificate) concerning PKI) 94.

Release of the public key certificate 97 and release of a certificate revocation list 99.

(5) Acceptance of public key certificate revocation

A method of notifying that the public key certificate 97 becomes invalid (theft, trust decrease of object user, etc.), different from a period of validity 97*b* described in the public key certificate 97 (certificate revocation list; CRL).

(6) Mutual authentication with other certification authority 93

Certification authorities 93 and 95 have a relationship of mutual authentication.

Hereinafter, the public key certificate 97 will be described in detail.

In FIG. 21A, the public key certificate format 97F is provided with fields from a version 971 to an encoded text 987. Since the certification authority 93 adds an e-signature to a last signature 97*d* of the public key certificate 97, an unauthorized third party can not "pretend" and "manipulate". The e-signature of the certification authority 93 is made by applying a field value from the version 971 to an extension 984 of the public key certificate 97 to a hash function 101, and by encoding the result with a private key 93 κ of the certification authority 93 to be made encoded text 102.

The certification authority 93 issues the public key certificate 97 to which the e-signature 97*d* is added to the mail transmitting/receiving users 91A and 91B.

When acquiring the public key certificate 97 from the certification authority 93 or the opponent user, the mail transmitting/receiving users 91A and 91B are required to verify whether or not the e-signature added to the acquired public key certificate 97 of the opponent user is authenticated. Therefore, the mail transmitting/receiving users 91A and 91B are required to preliminarily acquire "public key certificate of the certification authority itself" (hereinafter, referred to as a root certificate).

As for the root certificate preliminarily acquired, it is required to visually verify (verify the signature in FIG. 20) e.g. a coincidence of its finger print (thumbmark; numerical value of a short fixed length obtained by passing the certificate through the hash function) and a finger print released on a Web site or the like. When the above-mentioned two finger prints are coincident with each other, the mail transmitting/receiving users 91A and 91B can trust the root certificate.

Also, since the root certificate of the famous certification authority 93 is bundled with software (mail client software or the like), the mail transmitting/receiving user is not required to take the trouble to obtain the root certificate separately.

Hereinafter, the certificate revocation list 99 will be described in detail.

The certificate revocation list 99 is for informing the public of the invalidity of the public key certificate 97 when it becomes invalid for some reason (e.g. theft, trust decrease of object user, etc.) outside the period of validity described in the public key certificate 97.

In FIG. 21B, the certificate revocation list format 99F is provided with fields from an algorithm 991 to an encoded text 1000. In the same way as the public key certificate format 97F, the e-signature of the certification authority 93 is added to the last of the format 99F.

In the certificate revocation list 99, a list of a serial No. 996 of the invalid certificate is described.

Each field of the public key certificate 97 and the certificate revocation list 99 shown in FIGS. 21A and 21B will now be described in detail.

X.509 Ver3 Public Key Certificate 97

(1) Version 971

(2) Certificate Serial Number 972

This is a unique integer value per issue certification authority 93 and corresponds to a certificate in a one-to-one relationship.

(3) Signature algorithm identifier 97*a*

This includes an identifier of an algorithm 973 of a signature 97*d* of the certification authority 93 added to the last of this public key certificate 97 and a parameter 974 concerning the algorithm 973. These are respectively same values as an algorithm 985 and a parameter 986 within the signature field 97*d* described later.

(4) Issuer name 975

This is a name (X.500 name) of the certification authority 93 which has prepared the public key certificate 97 and has signed. X.500 name is a name for uniquely identifying an object on a X.500 directory which is a database with a tree structure. For example, {C=jp, O=organization name, CN=name of certification authority 93}, where C: country/O: organization/CN: Common Name.

(5) Period of validity 97*b*

This includes a beginning and ending of a period of validity in the public key certificate 97.

(6) Subject name 978

This is an X.500 name of a user. For example, {C=jp, O=organization name, CN=user name, E=e-mail address of user}, where E indicates an E-mail address.

(7) Subject's public-key information 97*c*

This includes a public key 981 of a user, an identifier of an algorithm 979 decoded with the key 981, and its concerning parameter 980.

(8) Issuer Unique Identifier 982

This is used for uniquely identifying the issuing certification authority 93 when the same X.500 name is reused for a different organization. This identifier is rarely used.

(9) Subject Unique Identifier 983

When the X.500 name is reused for a different user, the identifier 983 is used for uniquely identifying the user. This identifier is rarely used.

(10) Extension 984

This is a various extension field.

(1) Signature 97*d*

This is a signature by the certification authority 93 of the public key certificate 97. The identifier of the algorithm 985 of the signature and its concerning parameter 986 have the same values as those in the above-mentioned signature algorithm identifier 97*a*.

Certificate Revocation List 99

(1) Signature algorithm identifier 99*a*

This includes an identifier of an algorithm 991 of a signature 99*c* of the certification authority 93 added to the last of the certificate revocation list 99 and its concerning parameter 992. These are respectively the same values as an algorithm 998 and a parameter 999 within a field of the signature 99c described later.

(2) Issuer name 993

This is a name of the certification authority 93 which has prepared and signed the certificate revocation list 99 (X.500 name).

(3) Dates of update 994 and 995

The date of update 994 is an issue date and time of the certificate revocation list 99. The date of update 995 is a date when the issue of the next certificate revocation list 99 is expected.

(4) Invalidated signature 99b

This includes a serial No. 996 of the invalidated public key certificate 97 and a date of an invalidation 997. By the serial No. 996, the public key certificate 97 can be uniquely identified.

(5) Signature 99c

This is a signature 99c by the certification authority 93 of the certificate revocation list 99. The identifier of the algorithm 998 of the signature 99c and its concerning parameter 999 have the same values as those in the above-mentioned signature algorithm identifier 99a.

Meanwhile, there is an authentication delegating method in which an authentication delegating server distributes an encoding public key of a service provider corresponding to a desired service to a client upon rendering services, and transfers encoded information received from the client to the provider, the client encodes information to be transmitted to the provider with the encoding public key received from the authentication delegating server, and transmits the encoded information to the authentication delegating server, and the provider decodes the encoded information received from the authentication delegating server with an encoding secret key (see e.g. patent document 1).

[Patent Document 1] Japanese Patent Publication laid-open No. 2001-134534

However, in the case of the prior art shown in FIG. 20, where mail transmitting/receiving users (hereinafter, occasionally referred to as simply users) 91A and 91B of an ISP (Internet service provider) freely transmit/receive encoded and e-signed mails to acquaintances even though a PKI is utilized for an electronic commerce or the like between enterprises, there are the following problems:

Firstly, since the users 91A and 91B having already joined the ISP require the public key certificate 97 of the certification authority 93, both of the users 91A and 91B require an operational effort and an issue fee according to the level of the trust of the public key certificate 97. Accordingly, even if the users 91A and 91B desire to transmit the encoded/e-signed mail for their convenience, it is required to have the opponent users 91A and 91B bear the issue cost of the public key certificate 97 of the certification authority 93 or the like.

Secondly, since the certification authority 93 manages the public key certificate 97, a management cost of the public key certificate 97 is required. Namely, the certification authority 93 releases the public key certificate 97 to the repository 94, and renders a retrieval service to an arbitrary person, so that the costs for the management and the retrieval service of the public key certificate 97 occur in the certification authority 93. Accordingly, the certification authority 93 charges the users 91A and 91B with the fees.

Thirdly, the users 91A and 91B of the ISP have a risk for distributing private information to numerous places. When the users 91A and 91B register the public key in the certification authority 93, the public key is released to an indefinite number of persons. Therefore, there is a tendency of hesitating to entrust private information to another organization different from the ISP for fear of leakage of the private information.

Also, the PKI has the following problems concerning a certificate revocation:

Firstly, although the certification authority 93 revokes the concerned public key certificate 97 by the certificate revocation list 99 released based on the statement of the users 91A and 91B, it is not guaranteed that the certificate revocation list 99 is always reflected in real time in the users 91A and 91B having already acquired the public key.

Secondly, contrary to the above-mentioned description, since the certificate revocation list 99 is widely released to an indefinite number of users, there is a problem concerning privacy that the erosion of trust of the users 91A and 91B is released to others (not a user having already acquired the public key) having nothing to do with themselves.

The above-mentioned problem of the certificate revocation occurs since the certification authority 93 can not manage to whom the users 91A and 91B should release the public key certificate 97, or who has acquired the public key certificate 97, even if the certification authority 93 manages the public key certificate 97. As for the reason why the certification authority 93 can not perform such a management, problems on a management cost or a technology (including the absence of standardization) can be conceived.

The ISP (Internet Service Provider) provides a connection environment to the Internet for the users 91A and 91B, and provides e-mail service and a mailbox for temporarily storing the e-mails. In a process of a service subscribing procedure of the users 91A and 91B, the addresses of the users 91A and 91B are confirmed by mail, or credit information of the users 91A and 91B is confirmed by credit card numbers. Also, in the above process, the ISP transmits passwords for the users 91A and 91B to connect to the network, and passwords to connect to a mail server providing the mailbox.

User authentication of the ISP indicates an authentication mechanism utilizing a user ID and a password issued by the ISP based on the confirmed private information of the user mentioned above.

The above-mentioned user authentication of the ISP has been performed by a server of the ISP with user authentication data (user ID and password) when the users 91A and 91B of the ISP transmit/receive e-mails through the Internet, and has been widely available.

SUMMARY OF THE INVENTION

It is accordingly an object of the present invention to provide an e-mail transfer method and device for transferring an e-mail by a public key cryptography between an e-mail transmission device and an e-mail reception device, in which not a public key certificate of an existing certification authority but a server of an ISP is used, thereby enabling the transmission/reception of an e-mail to be more simply performed.

Solution Concept

Firstly, in the same way as the prior art shown in FIG. 19, network paths except the users 91A and 91B including the server of the ISP are entirely encoded.

Secondly, the users 91A and 91B are not required to entrust new private information to the ISP. Namely, it should be arranged that the same trouble as one in a case where the users 91A and 91B have the certification authority 93 certificate their own public key certificates 97 does not occur.

Thirdly, the ISP does not manage the public keys of the users 91A and 91B. Namely, cost increase of the ISP due to setting a new database except already owned authentication data of the users 91A and 91B is suppressed. It should be arranged that the same cost as the management cost of the public key certificate 97 of the certification authority 93 does not occur in the ISP. Also, it should be arranged that the users 91A and 91B are not required to entrust new private information to the ISP.

Fourthly, the public key is revoked at the same time of a user authentication revocation of the ISP. Namely, the ISP does not manage the public keys of the users 91A and 91B, and authenticates the users every time a mail is transmitted/received. Therefore, whether or not the users 91A and 91B are reliable can be reflected in other users 91A and 91B in real time. Also, since the user authentication is performed with an intention of the mail transmission/reception between the users 91A and 91B as a trigger, the trust of the users 91A and 91B is never released widely to others having nothing to do with the users 91A and 91B.

Fifthly, the users 91A and 91B can transmit/receive the mail by the same procedure as the prior art public key cryptography. Namely, while a trouble in a case where the users 91A and 91B have the certification authority 93 certificate their own public key certificates 97 does not occur, a corresponding increase of other troubles is suppressed.

(1) In order to achieve the above-mentioned object, based on such a solution concept, an e-mail transfer method for transferring an e-mail by a public key cryptography comprises: a trigger message reception step of receiving a trigger message to which user authentication data and a public key are added; a user authentication step of authenticating the user authentication data; a trigger message trust assignment step of assigning trust to the public key within the trigger message to be transmitted when the user authentication data within the trigger message are authenticated by the user authentication step; a response message reception step of receiving a response message to which user authentication data and a public key are added; and a response message trust assignment step of assigning trust to the public key within the response message to be transmitted when the user authentication data within the response message are authenticated by the user authentication step.

Namely, firstly in the e-mail transfer method of the present invention, a trigger message reception step receives a trigger message to which user authentication data and a public key are added. A user authentication step authenticates the user authentication data. When the user authentication data within the trigger message are authenticated by the user authentication step, a trigger message trust assignment step assigns trust to the public key within the trigger message to be transmitted. A response message reception step receives a response message to which the user authentication data and the public key are added. When the user authentication data within the response message are authenticated by the user authentication step, a response message trust assignment step assigns trust to the public key within the response message to be transmitted.

The principle of the above-mentioned present invention will now be specifically described referring to FIGS. 1, 2A and 2B.

In FIG. 1, a mail transmitting user uses a client 1A, and a mail receiving user uses a client 1B. The mail transmitting user in FIG. 1 indicates a user finally transmitting an encoded/e-signed mail, and the mail receiving user indicates a user finally receiving the encoded/e-signed mail. In a process up to the transmission/reception of the encoded/e-signed mail, the mail transmitting user and the mail receiving user transmit/receive a trigger message 3 (see FIG. 2A) and a response message 4 (see FIG. 2B).

The trigger message 3 has a header portion, and user authentication data and a public key 1α are added thereto. Similarly, the response message 4 has a header portion, and the user authentication data and a public key 1γ are added thereto.

In FIG. 1, a server 5 as an e-mail transfer device managed by an ISP 6 has a mailbox for the mail transmitting/receiving user, and performs user authentication for an access from the mail transmitting/receiving user. The server 5 has a function corresponding to a mail server and an authentication server of the conventional technology.

It is to be noted that in the conventional technology, the mail server, in many cases, is a sendmail server dealing with "sendmail" that is a mail transmitting/receiving protocol and a POP (Post Office Protocol) server dealing with a POP that is a protocol reading a mail from a system where e-mails are spooled. Also, in some cases, an IMAP (Internet Message Access Protocol) is substituted for the POP.

It is to be noted that while the above-mentioned mail server and authentication server are described as a single server in FIG. 1, they may be realized by a plurality of servers.

A message transmission/reception sequence between the client 1A and the client 1B will now be described along steps S1-S7. It is to be noted that at the following steps S1-S7, the processing performed by the mail transmitting user and the mail receiving user is actually performed electronically by the client 1A and the client 1B respectively.

Step S1: The mail transmitting user prepares the public key 1α and a private key 1β preliminarily or at the beginning of a series of procedures. The mail transmitting user transmits the trigger message 3 to the server 5 in order to obtain the public key 1γ. At this time, the mail transmitting user attaches the public key 1α of the mail transmitting user so that the mail receiving user can verify an e-signature of the mail transmitting user. Also at this time, in order to take the user authentication from the ISP 6, the mail transmitting user transmits user authentication data 7 at the same time.

Step S2: The server 5 of the ISP 6 compares the user authentication data of the mail transmitting user with the user authentication data 7 of the ISP 6 to authenticate the user, so that trust is assigned or added to the public key 1α within the trigger message 3 at step S1 (attachment "trust" of FIG. 1).

It is to be noted that when a user authentication result is found to be authorized, the server 5 assigns the trust to the trigger message 3 every time a mail is transmitted/received in a series of procedures.

It is to be noted that for assigning the trust, there is a method such that e.g. the server 5 adds to the trigger message 3 an e-signature by a private key of the ISP 6. The method of assigning the trust is not limited to this method.

Step S3: The mail receiving user acquires the trigger message 3. The mail receiving user verifies whether or not the trust of the public key 1α within the trigger message 3 is guaranteed. As a result of verification, if it is found to be guaranteed, the mail receiving user obtains the public key 1α of the mail transmitting user whose trust concerning the mail transmission/reception is certified.

It is to be noted that when acquiring the trigger message 3, the mail receiving user concurrently transmits the user authentication data to the server 5 in order to take the user authentication from the ISP 6.

It is to be noted that the mail transmitting/receiving user performs the above-mentioned verification e.g. by decoding the e-signature of the ISP 6 added to the trigger message 3 with the public key of the server 5. The method of the verification is not limited to this method.

Step S4: The mail receiving user prepares the public key 1γ and a private key 1δ preliminarily or at the beginning of a series of procedures. The mail receiving user transmits the response message 4 including the public key 1γ of the mail receiving user. At this time, in order to take the user authentication from the ISP 6, the mail receiving user transmits the user authentication data at the same time.

Step S5: The server 5 of the ISP 6 compares the user authentication data at the above step S4 with the authentication data 7 of the ISP 6 to perform the user authentication, thereby assigning the trust to the response message 4 of the mail receiving user at the above-mentioned step S4.

It is to be noted that the server 5 assigns the trust when the user authentication result is found to be guaranteed to the response message 4 every time the mail is transmitted/received in a series of procedures.

Step S6: The mail transmitting user acquires the response message 4. The mail transmitting user verifies whether or not the trust of the public key 1γ within the response message 4 is guaranteed. As a result of verification, if it is found to be guaranteed, the mail transmitting user obtains the public key 1γ of the mail receiving user whose trust concerning the mail transmission/reception is certified.

It is to be noted that when acquiring the response message 4, the mail transmitting user concurrently transmits the user authentication data in order to take the user authentication from the ISP 6.

Step S7: The mail transmitting user transmits an encoded/e-signed mail e-signed with its own private key 1 and encoded with the public key 1γ of the mail receiving user to which the trust is assigned.

Accordingly, the above-mentioned procedures performed by the client and the server achieve the object, while satisfying the conditions of the above-mentioned solution concept, of transmitting/receiving encoded/e-signed mails without requiring the mail transmitting/receiving user to have the public key newly certified by the certification authority and without having the certification authority or some organization manage the public key certificate.

Also, in the present invention, by generating a pair of public key and private key every time a mail is transmitted/received, there is an effect of reducing danger of a leakage of a private key, compared with the conventional technology in which a pair of public key and private key once prepared are stored for a long period.

(2) As a device realizing the e-mail transfer method of the present invention, an e-mail transfer device for transferring an e-mail by a public key cryptography between an e-mail transmission device and an e-mail reception device comprises: trigger message reception means receiving from the e-mail transmission device a trigger message to which user authentication data and a public key are added; user authentication means authenticating the user authentication data; trigger message trust assignment means assigning trust to the public key within the trigger message to be transmitted to the e-mail reception device when the user authentication data within the trigger message are authenticated by the user authentication means; response message reception means receiving from the e-mail reception device a response message to which user authentication data and a public key are added; and response message trust assignment means assigning trust to the public key within the response message to be transmitted to the e-mail transmission device when the user authentication data within the response message are authenticated by the user authentication means.

Namely, in the e-mail transfer device of the present invention, trigger message reception means receive from the e-mail transmission device a trigger message to which user authentication data and a public key are added. User authentication means authenticate the user authentication data. When the user authentication data within the trigger message are authenticated by the user authentication means, trigger message trust assignment means assign trust to the public key within the trigger message to be transmitted to the e-mail reception device. Response message reception means receive from the e-mail reception device a response message to which the user authentication data and the public key are added. When the user authentication data within the response message are authenticated by the user authentication means, response message trust assignment means assigns trust to the public key within the response message to be transmitted to the e-mail transmission device.

Thus, the e-mail transfer device assigns the trust to the public key within the trigger message from the e-mail transmission device to be transmitted to the e-mail reception device, and assigns the trust to the public key within the response message from the e-mail reception device to be transmitted to the e-mail transmission device. Accordingly, instead of the certification authority, the e-mail transfer device assigns the trust to the public key of the e-mail transmission device and the e-mail reception device, thereby enabling the transmission/reception of the e-mail by the public key cryptography.

(3) In the above-mentioned e-mail transfer device, the e-mail transmission device may have trigger message transmission means transmitting the trigger message to the e-mail transfer device, response message acquisition means acquiring from the e-mail transfer device the response message from the e-mail reception device, response message trust assignment verification means verifying whether or not trust is assigned to the public key within the response message, and mail transmission means transmitting to the e-mail reception device an e-mail electronically signed with a private key of the e-mail transmission device and encoded with a public key of the e-mail reception device to which the trust is assigned when the response message trust assignment verification means verify that the trust is assigned to the public key within the response message.

Namely, in the above-mentioned e-mail transmission device, trigger message transmission means transmit the trigger message to the e-mail transfer device. Response message acquisition means acquire from the e-mail transfer device the response message from the e-mail reception device. Response message trust assignment verification means verify whether or not trust is assigned to the public key within the response message. When the response message trust assignment verification means verify that the trust is assigned to the public key within the response message, the mail transmission means transmit to the e-mail reception device an e-mail electronically signed with a private key of the e-mail transmission device and encoded with a public key of the e-mail reception device to which the trust is assigned.

Accordingly, the e-mail transmission device acquires the public key to which the trust is assigned, and can transmit the e-mail encoded and e-signed by the public key cryptography to the e-mail reception device.

(4) Also, in the above-mentioned e-mail transfer device, the e-mail reception device may have trigger message acquisition means acquiring the trigger message from the e-mail transfer device, trigger message trust assignment verification means verifying whether or not trust is assigned to the public key within the trigger message, response message transmission means transmitting the response message to the e-mail transfer device when the trigger message trust assignment verification means verify that the trust is assigned to the public key within the trigger message, and mail reception means decoding an e-mail from the e-mail transmission device with a private key of the e-mail reception device itself, and further decoding the electronic signature with a public key of the e-mail transmission device.

Namely, in the above-mentioned e-mail reception device, trigger message acquisition means acquire the trigger message from the e-mail transfer device. Trigger message trust assignment verification means verify whether or not the trust is assigned to the public key within the trigger message. When the trigger message trust assignment verification means verify that the trust is assigned to the public key within the trigger message, response message transmission means transmit the response message to the e-mail transfer device. Mail reception means decode an e-mail from the e-mail transmission device with a private key of the e-mail reception device itself and decode the e-signature with a public key of the e-mail transmission device.

Accordingly, the e-mail reception device acquires the public key to which the trust is assigned within the trigger message, and can receive the encoded/e-signed mail by the public key cryptography from the e-mail transmission device.

(5) Also, the above-mentioned trigger message trust assignment means may add an electronic signature of the e-mail transfer device for the public key of the e-mail transmission device to a public key certificate portion which is blank within the trigger message, and may add an electronic signature of the e-mail transfer device for the public key of the e-mail reception device to a public key certificate portion which is blank within the response message.

Accordingly, the trust is assigned to the public key within the trigger message and the response message by the e-signature of the public key certificate portion.

(6) In the e-mail transfer device of the present invention, the e-mail transmission device and the e-mail reception device may add a same message identifier which is unique within a network to the trigger message and the response message.

Accordingly, the e-mail transmission device and the e-mail reception device can reliably manage the messages by the same message identifier which is unique within a network and is assigned to the trigger message and the response message.

(7) Also, the above-mentioned trigger message trust assignment means may add a trust assignment identifier to a header portion of the trigger message, and the response message trust assignment means may add a trust assignment identifier to a header portion of the response message.

Namely, the trigger message trust assignment means assign a trust assignment identifier to a header portion of the trigger message, thereby enabling the public key within the trigger message to be guaranteed. The response message trust assignment means assign a trust assignment identifier to a header portion of the response message, thereby enabling the public key within the response message to be guaranteed.

Thus, in the e-mail transfer device, processing load becomes light compared with the case where an e-signature is placed on the public key certificate.

(8) Furthermore, the above-mentioned trigger message trust assignment means may transmit a trust assignment identifier together with the trigger message, and the response message trust assignment means may transmit a trust assignment identifier together with the response message.

Accordingly, in the e-mail transfer device, the trust assignment identifier together with the trigger message and the response message are transmitted, thereby enabling the trust to be assigned to the public key within the trigger message and the response message. Thus, in the e-mail transfer device, processing load becomes light compared with the case where an e-signature is placed on the public key certificate.

(9) Also, in the above-mentioned e-mail transfer device, when a trigger message including a public key of the e-mail transmission device and plaintext requesting the e-mail reception device to transmit an encoded and electronically signed mail is received from the e-mail transmission device, trust may be assigned to the public key of the trigger message to be transmitted to the e-mail reception device, and when a response message including a public key of the e-mail reception device and an encoded and electronically signed message is received from the e-mail reception device, trust may be assigned to the response message to be transmitted to the e-mail transmission device.

Accordingly, the e-mail transfer device can reduce the number of messages between the e-mail transmission device and the e-mail reception device.

(10) Also, in the above-mentioned e-mail transfer device, the e-mail transmission device and the e-mail reception device respectively may have storage means storing a public key of the other device together with its identifier and means substituting the identifier for the public key when transmitting the message after having stored the public key and the identifier in the storage means.

Namely, storage means of the e-mail transmission device and the e-mail reception device respectively store the public key of the opponent device and its identifier. Public key substitution means substitute the identifier for the public key when the message is transmitted after having stored the public key and the identifier in the key storage means.

Accordingly, since the identifier is transmitted when the e-mail transmission device and the e-mail reception device transmit a message to the same transmitting destination as before, an attachment of the public key certificate to the message is not required, so that the message data mount can be reduced.

(11) Also, the above-mentioned e-mail transfer device may further comprise validity determination means determining whether or not the trigger message or the response message is valid; the trigger message trust assignment means may return to the e-mail transmission device an invalid trigger message in which a header portion of the trigger message is changed when the validity determination means determine that the trigger message is not valid, and the response message trust assignment means may return an invalid response message in which a header portion of the response message is changed to the e-mail reception device when the validity determination means determine that the response message is not valid.

Namely, validity determination means determine whether or not the trigger message and the response message are valid. When the validity determination means determine that the trigger message and the response message are not valid, the trigger message trust assignment means return to the e-mail transmission device an invalid trigger message in which a header portion of the trigger message is changed, and the response message trust assignment means return to the e-mail reception device an invalid response message in which a header portion of the response message is changed.

Accordingly, since the e-mail transfer device can return the trigger message and the response message which are not valid to the e-mail transmission device and the e-mail reception device, the validity of the trigger message and the response message can be reflected in the e-mail transmission device and the e-mail reception device in further real time.

(12) Also, the above-mentioned e-mail transfer device may further comprise means inserting into the message a public key certificate of a destination e-mail transfer device into which the public key of the e-mail transfer device is inserted when a destination of the message is another e-mail transfer device mutually authenticated.

Accordingly, the e-mail transmission device and the e-mail reception device can transmit/receive the encoded/e-signed mail between the e-mail transfer devices mutually authenticated.

(13) Also, in the above-mentioned e-mail transfer device, the e-mail transmission device and the e-mail reception device may be provided with a message preparing user interface having a message preparing screen for designating a message, or a message management interface having a message state display screen for displaying a message state.

Namely, in the e-mail transmission device and the e-mail reception device, a message preparing screen of a message preparing user interface can designate a message, or a message display screen of a message management interface can display a message state.

Accordingly, the e-mail transmission device and the e-mail reception device can grasp interrelationship of a series of messages (trigger message—response message—encoded/e-signed message) by the message preparing user interface and the message management interface, and can prepare an appropriate message according to a state.

The e-mail transfer method and device according to the present invention receive a trigger message to which user authentication data and a public key are added, assign trust to the public key within the trigger message to be transmitted when the user authentication data within the trigger message are authenticated, receive a response message to which the user authentication data and the public key are added, and assign the trust to the public key within the response message to be transmitted when the user authentication data within the response message are authenticated by a user authentication step. Therefore, the e-mail transfer device, instead of the certification authority, authenticates the public key between the e-mail transmission device and the e-mail reception device by using a server of an ISP or the like, and easily and safely enables the e-mail transmission/reception by the public key cryptography.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which:

FIG. 1 is a block diagram showing a principle of an e-mail transfer method and device according to the present invention;

FIGS. 10A and 10B are format diagrams of a message used in an embodiment (2) of an e-mail transfer method and device according to the present invention, in which FIG. 10A shows a modification of the trigger message shown in FIG. 7, and FIG. 10B shows a modification of the response message shown in FIG. 8;

FIGS. 18A and 18B show message screen diagrams of a user interface in an embodiment (8) of an e-mail transfer method and device according to the present invention, in which FIG. 18A is a diagram showing a message preparing screen of a message preparing user interface, and FIG. 18B is a diagram showing a message management screen of a message management user interface;

FIGS. 21A and 21B are format diagrams of prior art public key certificate and certificate revocation list.

DESCRIPTION OF THE EMBODIMENTS

Embodiment (1)

FIGS. 3, 4, 5, 6, 7, 8, 9A and 9B

Figure 2A:
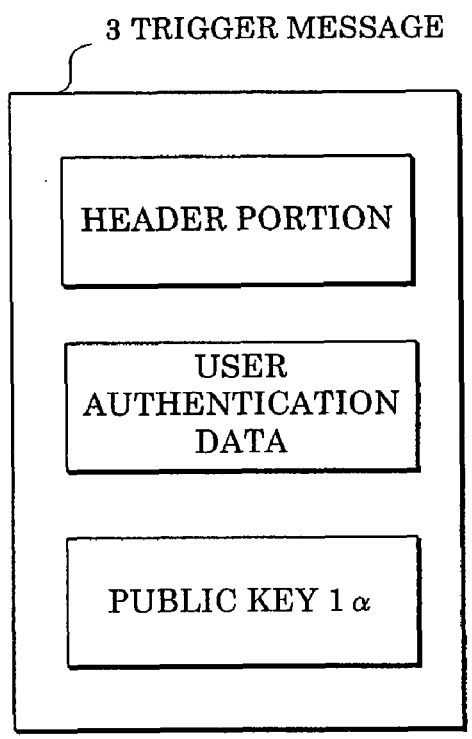
FIGS. 2A and 2B are schematic diagrams of a trigger message and a response message used for the present invention.
Figure 2B:
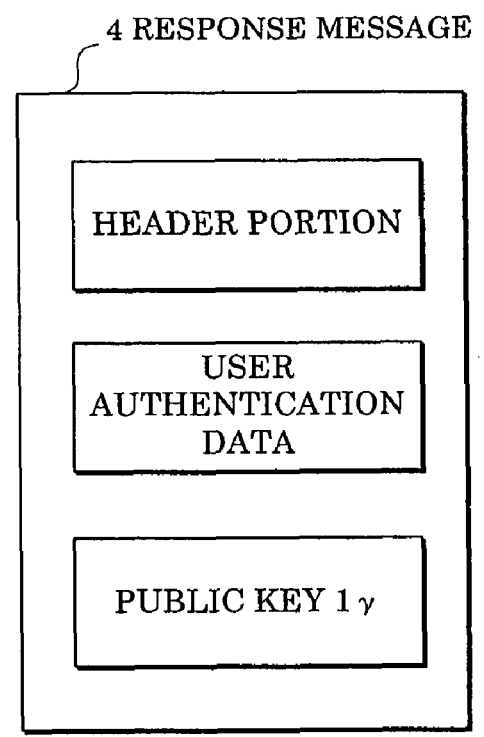
Figure 3:
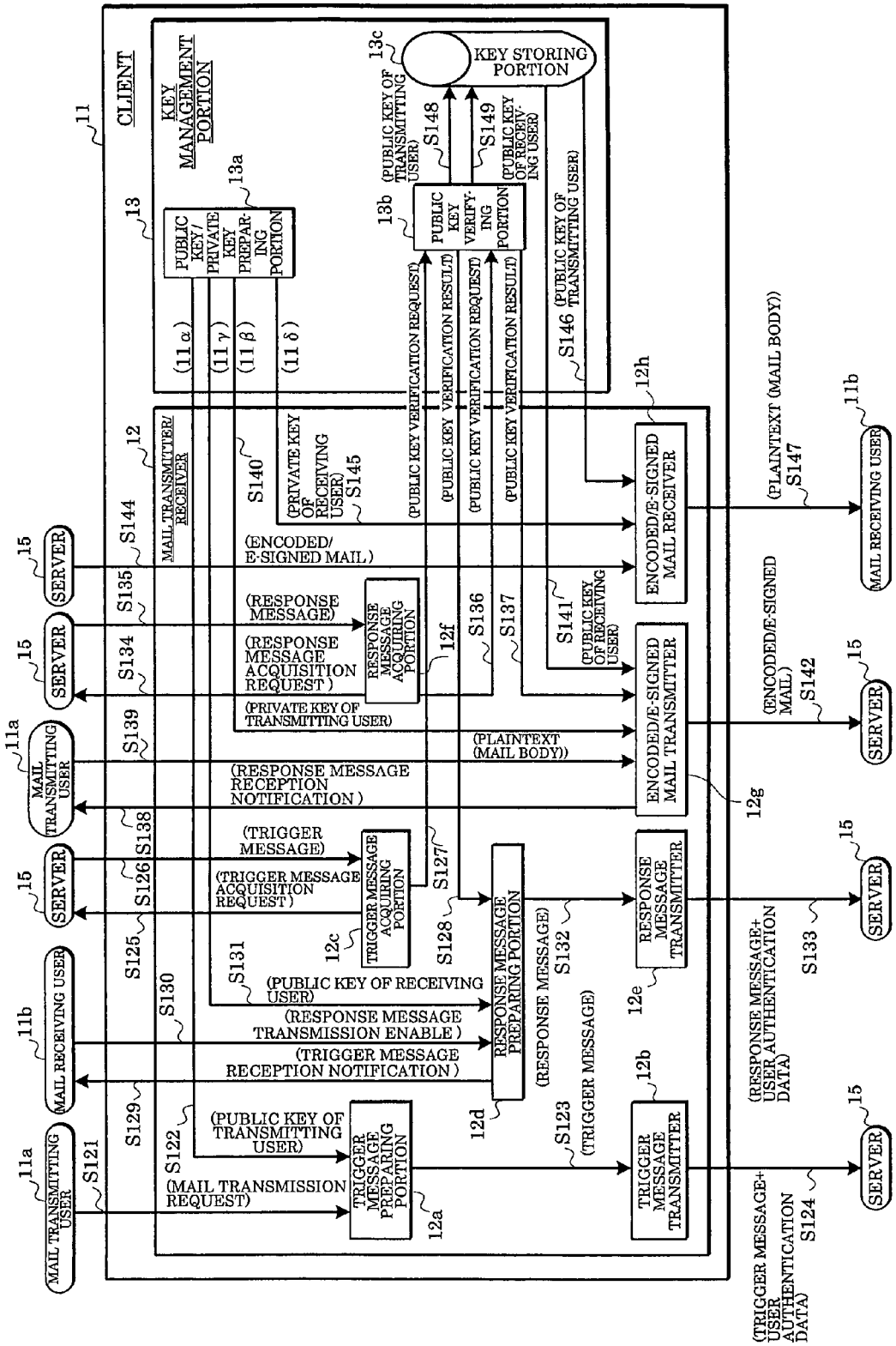
FIG. 3 is a block diagram showing a client in an embodiment (1) of an e-mail transfer method and device according to the present invention.
Figure 4:
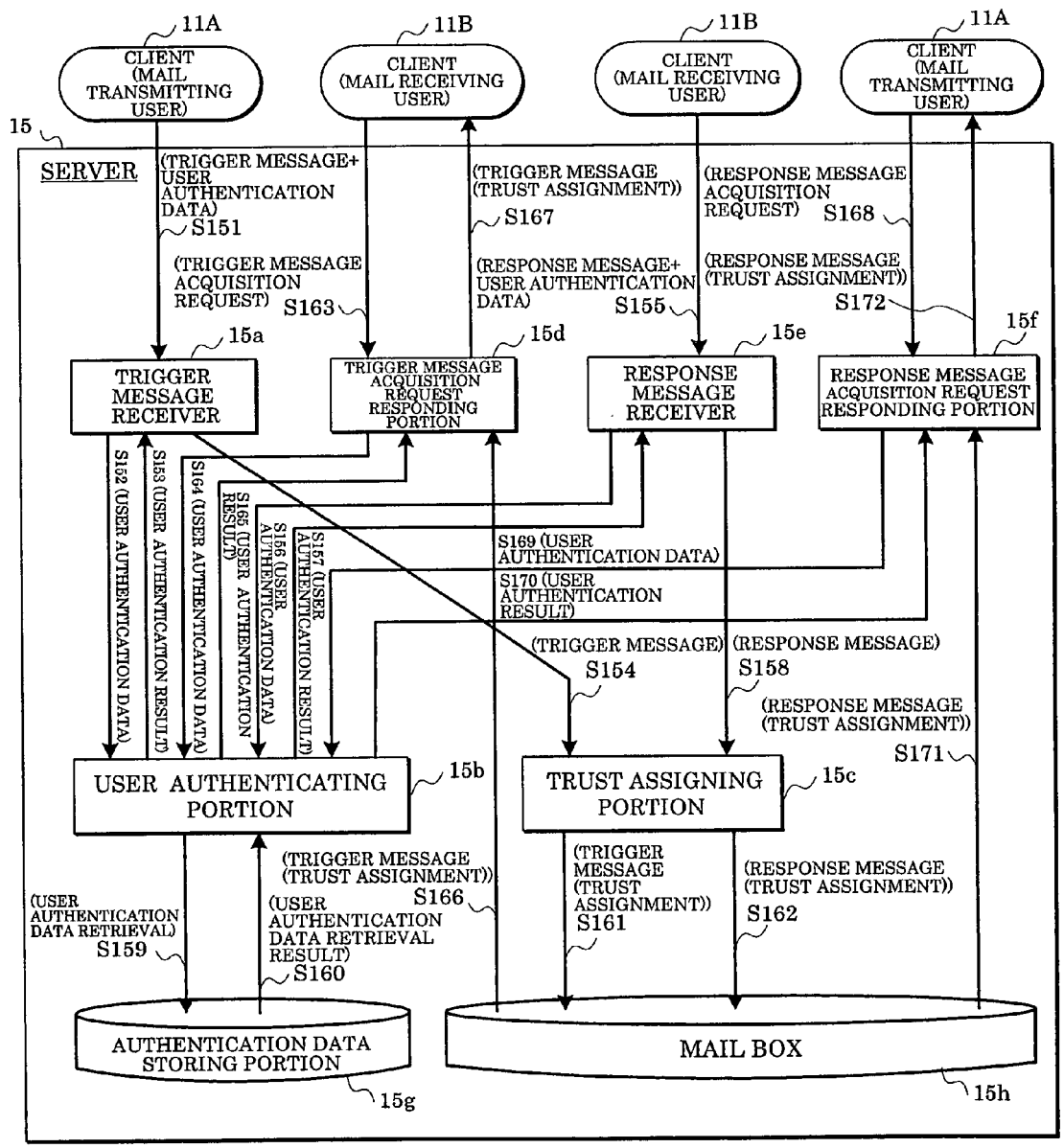
FIG. 4 is a diagram showing an arrangement of a server in an embodiment (1) of an e-mail transfer method and device according to the present invention.
Figure 5:
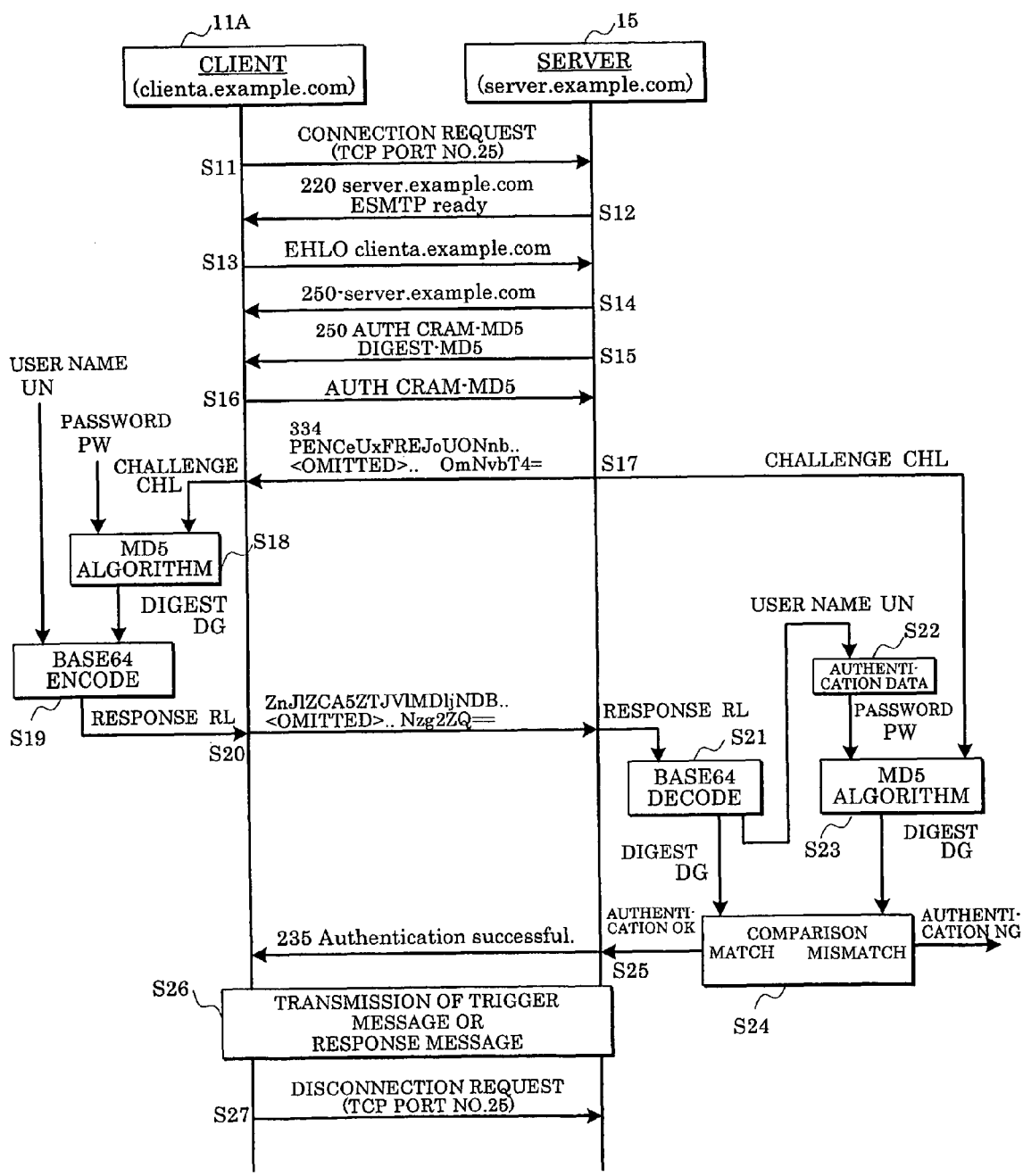
FIG. 5 is a sequence diagram showing a user authentication procedure at the time of transmitting a trigger message or a response message in an embodiment (1) of an e-mail transfer method and device according to the present invention.
Figure 6:
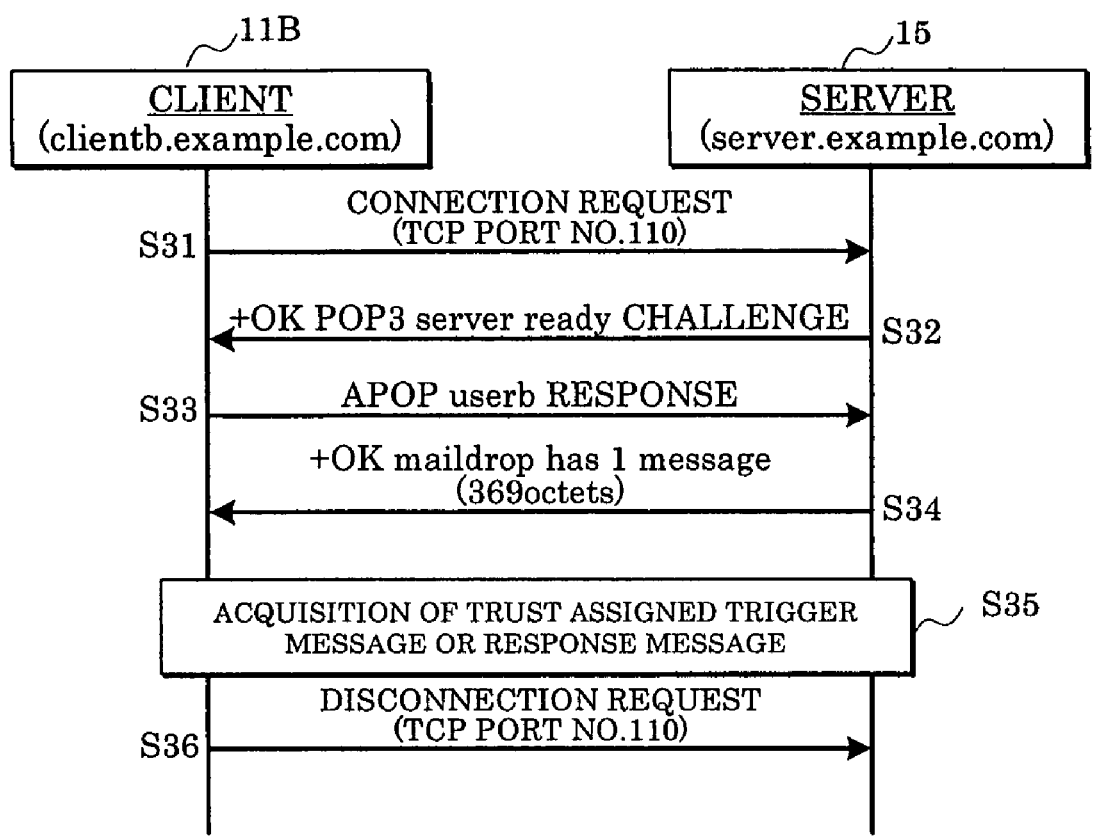
FIG. 6 is a sequence diagram showing a user authentication procedure at the time of acquiring a trigger message or a response message in an embodiment (1) of an e-mail transfer method and device according to the present invention.
Figure 7:
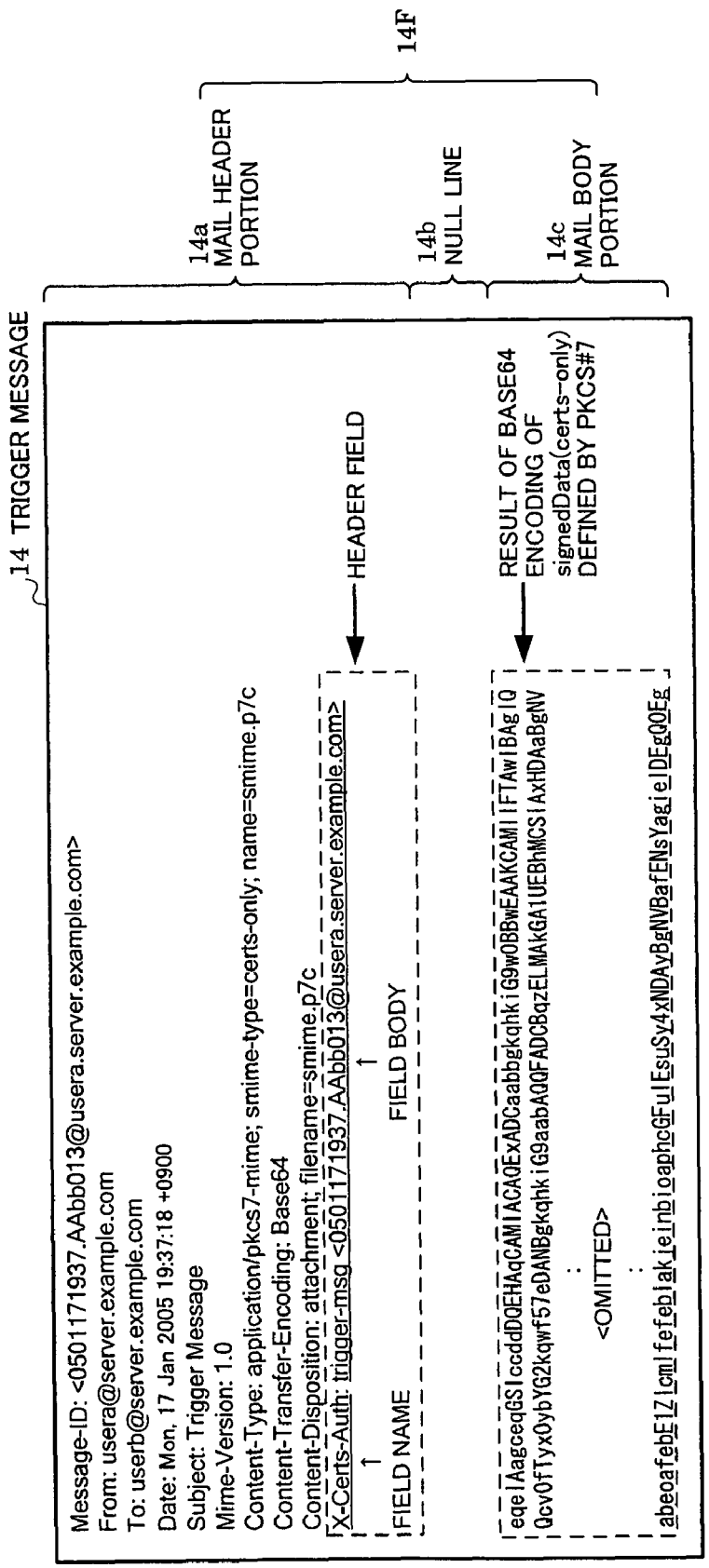
FIG. 7 is a format diagram specifically showing a trigger message in an embodiment (1) of an e-mail transfer method and device according to the present invention.
Figure 8:
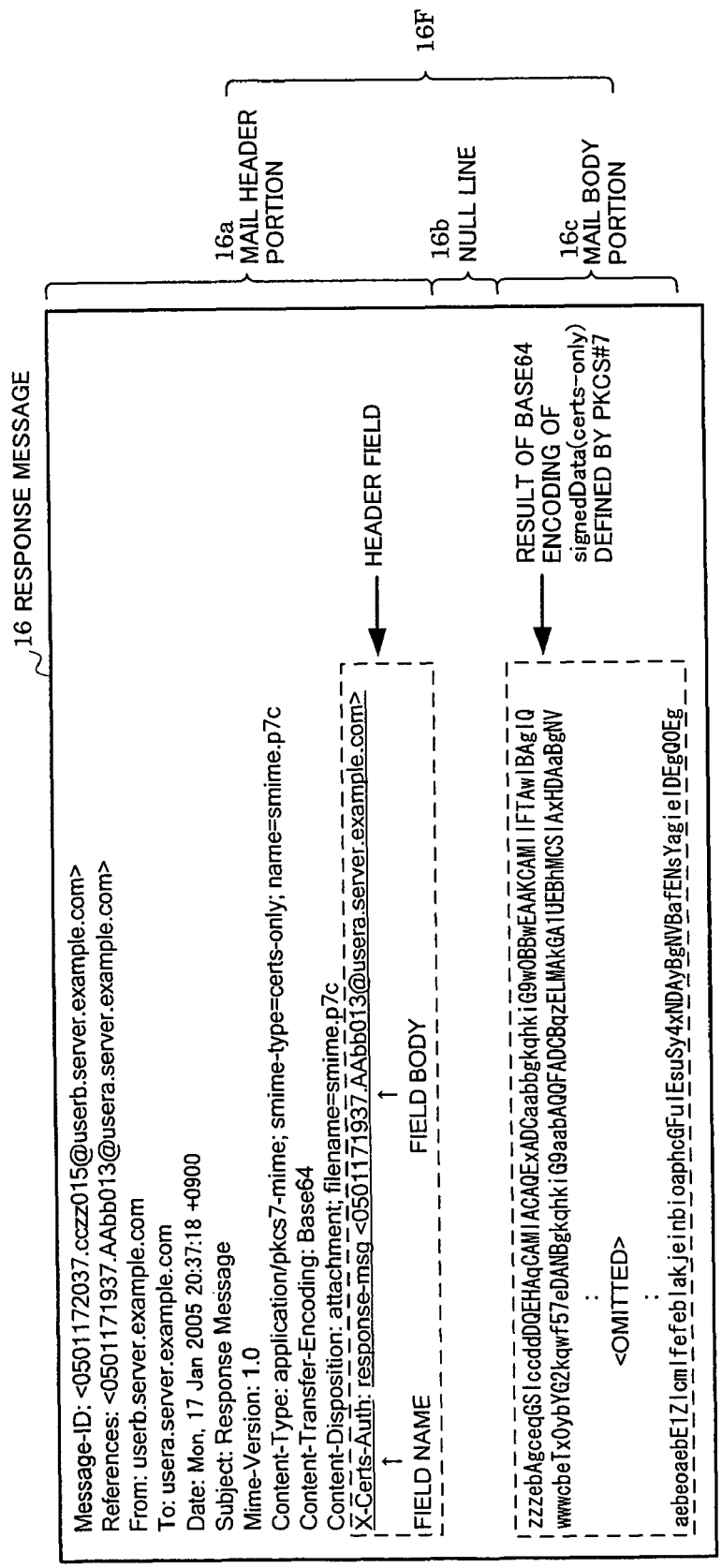
FIG. 8 is a format diagram specifically showing a response message in an embodiment (1) of an e-mail transfer method and device according to the present invention.
Figure 9A:
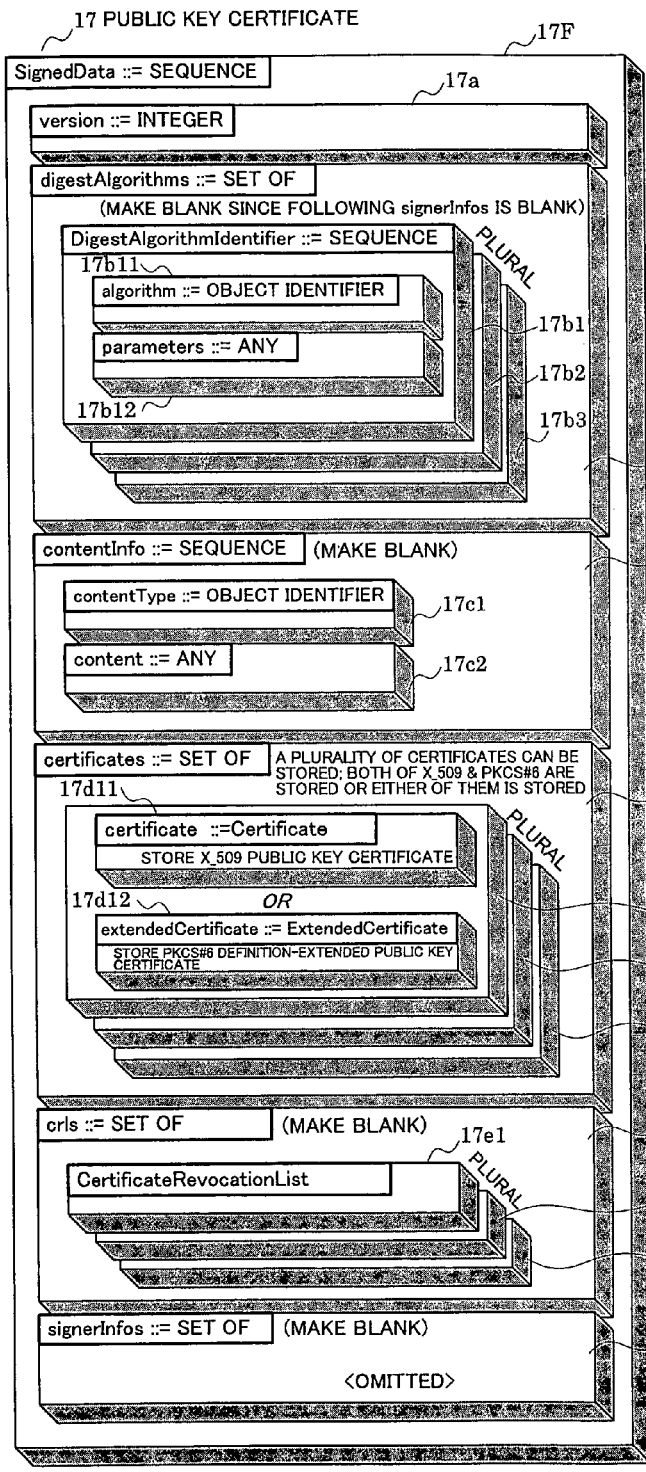
FIGS. 9A and 9B are format diagrams of signedData (certs-only) used for a trigger message and a response message in an embodiment (1) of an e-mail transfer method and device according to the present invention.
Figure 9B:
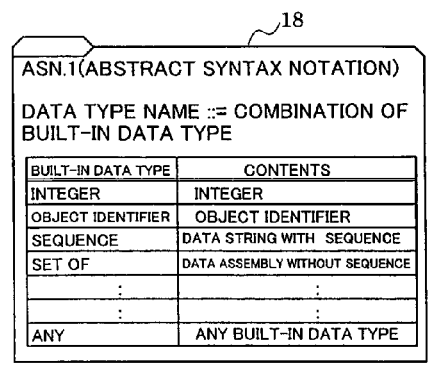

FIG. 3 shows a client of an embodiment (1) of the e-mail transfer method and device according to the present invention. FIG. 4 shows a server of the embodiment (1) of the e-mail transfer method and device according to the present invention. FIG. 5 shows a user authentication procedure when a trigger message or a response message is transmitted in the embodiment (1) of the e-mail transfer method and device according to the present invention. FIG. 6 shows a user authentication procedure when the trigger message or the response message is acquired in the embodiment (1) of the e-mail transfer method and device according to the present invention. FIG. 7 shows the trigger message of the embodiment (1) of the e-mail transfer method and device according to the present invention. FIG. 8 shows the response message of the embodiment (1) of the e-mail transfer method and device according to the present invention. FIGS. 9A and 9B show signedData (certs-only) formats used for the trigger message and the response message of the embodiment (1) of the e-mail transfer method and device according to the present invention. Hereinafter, the embodiment (1) will be described referring to the above-mentioned figures.

Client: e-mail Transmission Device and e-mail Reception Device

In FIG. 3, a client 11 is schematically composed of a mail transmitter/receiver 12 and a key management portion 13. The message transmitter/receiver 12 is composed of a trigger message preparing portion 12a, a trigger message transmitter 12b, a trigger message acquiring portion 12c, a response message preparing portion 12d, a response message transmitter 12e, a response message acquiring portion 12f, an encoded and e-signed (hereinafter, referred to as encoded/e-signed) mail transmitter 12g and an encoded/e-signed mail receiver 12h. The key management portion 13 is composed of a public key/private key preparing portion 13a, a public key verifying portion 13b and a key storing portion 13c.

It is to be noted that this client 11 has functions of both the clients 1A and 1B shown in FIG. 1, and a server 15 corresponds to the server 5 in FIG. 1. Although a plurality of clients and servers are shown in FIG. 1 and FIG. 3, they are respectively the same client and server.

Also, it is supposed that the client 11A has a public key 11α and a private key 11β, and the client 11B has a public key 11γ and a private key 11δ.

In operation, the trigger message preparing portion 12a, when triggered by a mail transmission request from the mail transmitting user 11a (at step S121), firstly inputs from the public key/private key preparing portion 13a the public key 11α of the mail transmitting user 11a (at step S122), and prepares a trigger message 14 shown in FIG. 7 which will be described later (at step S123). The trigger message transmitter 12b inputs the trigger message 14, communicates with the server 15 in a user authentication procedure shown in FIG. 5 which will be described later, and transmits the trigger message 14 to the server 15 (at step S124).

The trigger message acquiring portion 12c transmits a trigger message acquisition request to the server 15 at time intervals preset by the mail receiving user (at step S125), communicates with the server 15 in a user authentication procedure shown in FIG. 6 which will be described later, acquires the trigger message 14 (at step S126), and transmits a public key verification request to the public key verifying portion 13b to verify whether or not trust is assigned or added to the public key 11α of the mail transmitting user 11a within the trigger message 14 (at step S127).

The response message preparing portion 12d inputs the public key verification result (at step S128), and notifies a trigger message reception notification together with the public key verification result to the mail receiving user 11b (at step S129). When the verification result indicates that the trust is assigned, the mail receiving user 11b generally instructs a response message transmission enable to the response message preparing portion 12d (at step S130). Also, the response message preparing portion 12d inputs the public key 11γ of the mail receiving user 11b (at step S131) with the instructions as a trigger, and prepares a response message 16 shown in FIG. 8 which will be described later. The response message transmitter 12e inputs the response message 16 (at step S132), communicates with the server 15 in the user authentication procedure shown in FIG. 5 which will be described later, and transmits the response message 16 to the server 15 (at step S133).

The response message acquiring portion 12f transmits the response message acquisition request to the server 15 at time intervals preset by the mail transmitting user (at step S134), communicates with the server 15 in the user authentication procedure shown in FIG. 6 which will be described later, acquires the response message 16 (at step S135), and transmits the public key verification request to the public key verifying portion 13b to verify whether or not the trust is assigned to the public key 11γ of the mail receiving user 11b within the response message 16 (at step S136).

The encoded/e-signed mail transmitter 12g inputs the public key verification result (at step S137), and notifies the response message reception notification together with the verification result to the mail transmitting user 11a (at step S138). When the verification result indicates that the trust is assigned, the mail transmitting user 11a generally inputs plaintext (mail body) (at step S139), thereby instructing the transmission of the mail to the encoded/e-signed mail transmitter 12g.

Figure 19:
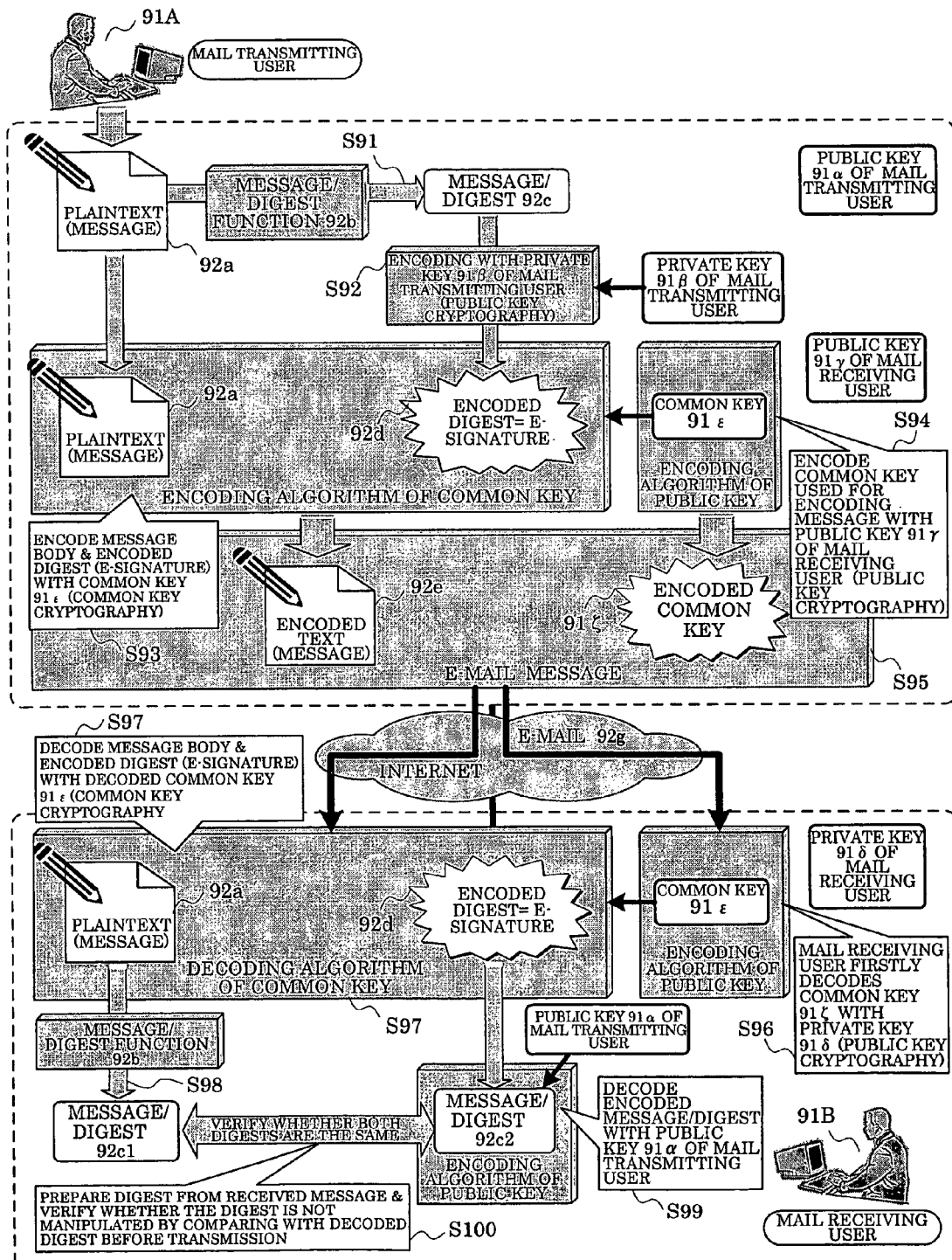
FIG. 19 is a sequence diagram illustrating a prior art procedure of transmitting/receiving an encoded/e-signed mail.
Figure 20:
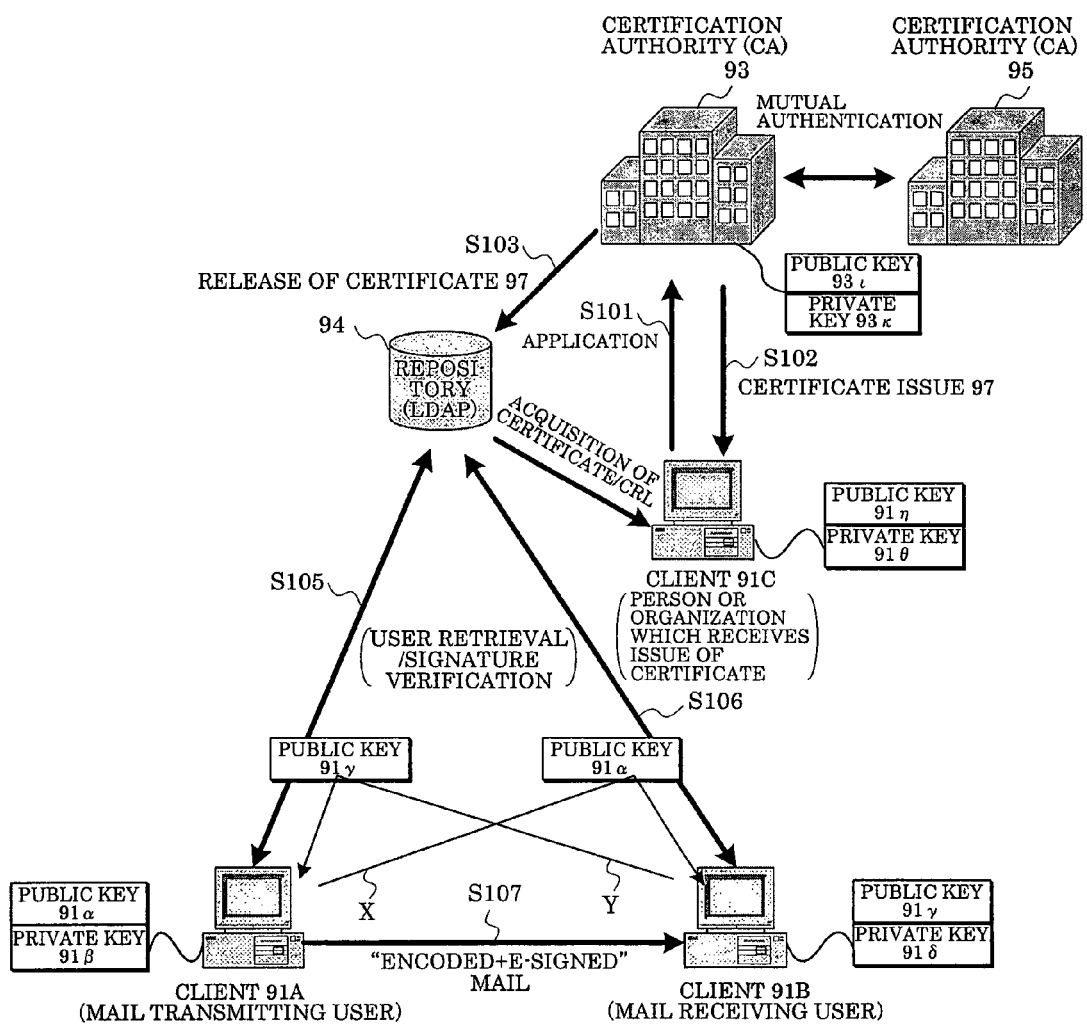
FIG. 20 is a diagram showing a prior art process from issuing a public key certificate by a certification authority to transmitting/receiving an encoded/e-signed mail by a mail transmitting/receiving user.

The encoded/e-signed mail transmitter 12g inputs the private key 11β of the transmitting user 11a (at step S140) with the input of the plaintext (mail body) of the mail transmitting user 11a as a trigger, inputs the public key 11γ of the receiving user 11b (at step S141), and transmits the encoded/e-signed mail prepared in the processing procedure shown in FIG. 19 to the server 15 (at step S142).

The encoded/e-signed mail receiver 12h transmits the mail acquisition request to the server 15 at time intervals preset (not shown), resulting in acquiring the encoded/e-signed mail from the server 15 (at step S144). The encoded/e-signed mail receiver 12h inputs the private key 11β of the mail receiving user 11b (at step S145), inputs the public key 11α of the mail transmitting user 11a (at step S146), obtains plaintext (mail body) by the processing procedure shown in FIG. 19, and presents the plaintext (mail body) together with the mail notification to the mail receiving user 11b (at step S147).

The public key/private key preparing portion 13a prepares a pair of public key/private key of its own (mail transmitter or mail receiver) every time a series of transmission or reception is made between trigger message 14—the response message 16, and outputs the key in response to a request of each processor shown in FIG. 3.

As mentioned above, the mail transmitting user 11a has the public key 11α and the private key 11β, and the mail receiving user 11b has the public key 11γ and the private key 11δ.

The public key verifying portion 13b verifies whether or not trust is assigned to the public key requested by the public key verification request, and notifies the public key verification result to each processor in FIG. 3.

In this embodiment, the public key verifying portion 13b performs verification based on whether or not the e-signature 97d of the server 15 of the ISP is assigned to the public key certificate 97 received with the public key certificate format 97F (see FIG. 21A). The public key verifying portion 13b preliminarily acquires the public key certificate of the ISP. The public key verifying portion 13b temporarily stores the verified public key (public key 11α of the mail transmitting user 11a or the public key 11γ of the mail receiving user 11b) during a series of transmission/reception procedures in the key storing portion 13c (at steps S148 and S149). The key storing portion 13c outputs the public key of the opponent user (mail transmitting user in case of mail receiving user, and vice versa) in response to a request of each processor in FIG. 3.

It is to be noted that an actual software mounting may adopt a module arrangement of larger units for the mail transmitter/receiver, such as a "transmitter/receiver" dealing with an SMTP (Simple Mail Transfer Protocol), an "acquiring portion" dealing with a POP and a "preparing portion" preparing a message, as long as each function of each processor mentioned above may be realized.

Server: e-mail Transfer Device

As shown in FIG. 4, the server 15 is composed of a trigger message receiver 15a, a user authenticating portion 15b, a trust assigning portion 15c, a trigger message acquisition request responding portion 15d, a response message receiver 15e, a response message acquisition request responding portion 15f, an authentication data storing portion 15g and a mail box 15h.

In operation, the trigger message receiver 15a communicates with a client in a user authentication procedure shown in FIG. 5 from the client (mail transmitting user) 11A, and receives the trigger message 14 (at step S151). At this time, the trigger message receiver 15a transmits the user authentication data (challenge and response shown in FIG. 5) to the user authenticating portion 15b (at step S152), and obtains the user authentication result (authentication OK/NG) from the user authenticating portion 15b (at step S153).

The trigger message receiver 15a transmits the received trigger message 14 to the trust assigning portion 15c if the authentication result is found OK (at step S154). For the response message 16, the response message receiver 15e receives the response message 16 in the same way as the trigger message receiver 15a (at step S155).

At this time, the response message receiver 15e transmits the user authentication data to the user authenticating portion 15b (at step S156), and obtains the user authentication result (authentication OK/NG) from the user authenticating portion 15b (at step S157). The response message receiver 15e transmits the received response message 16 to the trust assigning portion 15c if the authentication is OK (at step S158). The user authenticating portion 15b inputs the user authentication data from each processor in FIG. 4, performs a user authentication data retrieval with a user name for the authentication data storing portion 15g (at step S159), obtains the user authentication retrieval result, performs a user authentication based on the user authentication retrieval result (e.g. password) (at step S160), and transmits the user authentication result (authentication OK/NG) to each processor.

In this embodiment (1), the authentication data stored in the authentication data storing portion 15g are of a combination of user name and password. The trust assigning portion 15c inputs the trigger message 14 shown in FIG. 7 or the response message 16 shown in FIG. 8, and stores the trigger message 14 to which the trust is assigned or the response message 16 to which the trust is assigned in the mail box 15h (at steps S161 and S162).

In this embodiment (1), the trust assigning portion 15c obtains the public key certificate 97 (see FIG. 21A) whose e-signature 97d is blank, from the signedData (certs-only) 17 that is a mail body portion 14c of the trigger message 14 and a mail body portion 16c of the response message 16 decoded, verifies (whether or not user name is right or the like) the public key certificate 97, and assigns the e-signature of the ISP to the public key certificate 97, thereby realizing the assignment of the trust.

The trigger message acquisition request responding portion 15d acquires (at step S166) the trigger message 14 to which the trust has been already assigned from the mail box 15h through the user authentication procedure shown in FIG. 6 (at steps S164 and S165) with the trigger message acquisition request from the client 11B (mail receiving user) as a trigger (at step S163), and transmits the message to the client (mail receiving user) (at step S167). The response message acquisition request responding portion 15f also performs processing similar to that of the trigger message acquisition request responding portion 15d (at steps S168-S170), acquires the response message 16 to which the trust has been already assigned from the mail box 15h (at step S171) and transmits the message to the client (mail transmitting user) (at step S172).

It is to be noted that an actual software mounting may adopt a module arrangement of larger units such as a "receiver" dealing with an SMTP, an "acquisition request responding portion" dealing with a POP, a user authenticating portion, a trust assigning portion, an authentication data storing portion and a mail box 15h, as long as each function of each processor mentioned above is realized.

User Authentication: when a Mail is Transmitted

In this embodiment (1), when the trigger message 14 and the response message 16 are transmitted to the server 15 from the clients 11A and 11B, the clients 11A and 11B and the server 15 perform the user authentication. Generally, when the e-mail is transmitted from the client to the server, the SMTP (Simple Mail Transfer Protocol) defined by the RFC 821 has been used. Since representative mounting of the SMTP is "sendmail", it is also refereed to as a sendmail protocol. Furthermore, there has been an SMTP-AUTH (SMTP Service Extension for Authentication; defined by RFC 2554) which is a standard extending the SMTP for supporting the user authentication.

In this embodiment (1), the client uses the SMTP-AUTH for the user authentication when the client transmits the e-mail to the above-mentioned server, and transmits the trigger message or the response message of the present invention to the server by exchanging the client after performing the user authentication in the conventional technology.

Also, while the SMTP-AUTH is used as the user authentication utilizing the conventional technology, the user authentication is not limited to the SMTP-AUTH as long as the conventional technology, in the above-mentioned description, enables the user authentication. For example, as another conventional technology, there is a "POP before SMTP".

It is to be noted that "trigger message+user authentication data" transmitted from the trigger message transmitter 12b and "response message+user authentication data" transmitted from the response message transmitter 12e in FIG. 3 as well as "trigger message+user authentication data" received by the trigger message receiver 15a and "response message+ user authentication data" received by the response message receiver 15e in FIG. 4 correspond to the above-mentioned transmission.

FIG. 5 shows a user authentication procedure when the trigger message or the response message is transmitted as simply described above.

It is to be noted that in FIG. 5, the client 11A transmits the trigger message 14 or the response message 16 to the server 15. An FQDN (Fully Qualified Domain Name) of the client 11A is "clienta.example.com" and an FQDN of the server is "server.example.com". It is to be noted that the client 11A of FIG. 5 is one example while the same may apply to the client 11B or general clients equipped with the present invention. Hereinafter, the procedure in FIG. 5 will be specifically described along a message order (at steps S11-S27).

Step S11: In response to the request from the client 11A, a single full-duplex communication channel with the server 15 is secured. Generally, a TCP (Transmission Control Protocol) connection (server port No.=25) is used. Thereafter, a communication is performed by exchanging the command from the client 11A and the response from the server 15.

Step S12: The preparation of the server 15 has been completed. "220" is a response code, "server.example.com" indicates the FQDN of the server 15, and "ESMTP" indicates an extension SMTP.

Step S13: The client notifies that the client itself supports the extension protocol. "EHLO" indicates an Extended Hello command, and "clienta.example.com" indicates the FQDN of the client.

Step S14: A request has been normally completed. "250" indicates a response code.

Step S15: The contents of the extension service supported by the server 15 are notified to the client. In this example, the server 15 notifies the client 11A that the user authentication (AUTH) is supported, and as an algorithm, CRAM-MD5 (Challenge-Response Authentication Mechanism-Message Digest 5) and DIEGEST-MD5 are supported.

Step S16: The client notifies the server 15 that the CRAM-MD5 is used.

Step S17: The server 15 transmits to the client 11A a challenge character string CHL (PENCeUxFREJoUONnb. <omitted>OmNvbT4=). "334" indicates a response code (indicating that the notification of the client is received and the server 15 is waiting for a response). In this embodiment (1), the user authentication is performed by "challenge and response method". Thus, a password PW is encoded, and can be transmitted to the client 11A. It is to be noted that the server 15 prepares the challenge character string CHL based on a random value, a time stamp and an FQDN.

Step S18: The client 11A applies the challenge character string CHL decoded with the BASE64 (not shown) and the password PW to an MD5 algorithm (hash function) to obtain a digest DG.

Step S19: A combined character string of the user name UN, "blank" and the digest DG are encoded by a BASE64 to obtain a response RL. It is to be noted that the BASE64 is an encoding method for transmitting general data including binary data on an e-mail which can transfer only text data.

Step S20: The client 11A transmits to the server 15 a response character string RL (ZnJlZCA5ZTJVIMDljNDB. <omitted>. Nzg2ZQ==).

Step S21: The server 15 decodes the response character string RL with the BASE64 to obtain the digest DG and the user name UN.

Step S22: The user authentication data are retrieved with the user name, so that a corresponding password PW is obtained.

Step S23: By applying the password and the challenge to the MD5 algorithm, another digest is obtained.

Step S24: The server 15 compares the digest DG obtained as a result of decoding with the BASE64 to the digest obtained as a result of the application of the MD5 algorithm. When both results match with each other, the authentication is assumed to be OK while if they do not match with each other, the authentication is assumed to be NG.

Step S25: The server 15 notifies the authentication success to the client. "235" indicates a response code. It is to be noted that since the challenge and the response are different per user authentication, an unauthorized third party never succeeds in the user authentication even if the challenge and the response are tapped.

Step S26: The trigger message 14 or the response message 16 is transmitted.

Step S27: The client 11A requests the disconnection to the server 15 to complete a series of procedures.

User Authentication: when a Message is Acquired

In this embodiment (1), when the clients 11A and 11B acquire the trigger message 14 and the response message 16 from the server 15, the clients 11A and 11B and the server 15 also perform the user authentication. Generally, when the clients 11A and 11B acquire an e-mail from the server 15, the POP (Post Office Protocol) has been used in the conventional technology, and a POP3 (Post Office Protocol Version 3) is used at present.

However, as for the POP3, the clients 11A and 11B transmit the password PW corresponding to the user ID without encoding to the server 15. Therefore, in order to enhance security, there is an APOP (Authenticated Post Office Protocol) defined by RFC 1939 as a protocol for encoding the password PW to be transmitted.

In this embodiment (1), for the user authentication when the clients 11A and 11B acquire the message from the above-mentioned the server 15, the APOP is used. After the user authentication in the conventional technology, the clients 11A and 11B acquire from the server 15 the trigger message 14 to which the trust has been already assigned or the response message 16 to which the trust has been already assigned that is the present invention.

Also, while an APOP is used for the user authentication utilizing the conventional technology in the above-mentioned description, it is not limited to the APOP as long as the conventional technology can perform the user authentication.

It is to be noted that the "trigger message acquisition request" transmitted by the trigger message acquiring portion 12c, the "response message acquisition request" transmitted by the response message acquiring portion 12f in FIG. 3, the "trigger message acquisition request" transmitted by the trigger message acquisition request responding portion 15d and the "response message acquisition request" received by the response message acquisition request responding portion 15f in FIG. 4 correspond to the above-mentioned acquisition.

FIG. 6 shows a user authentication procedure when the trigger message 14 or the response message 16 of this embodiment (1) is acquired.

It is to be noted that in FIG. 6, the client 11B acquires the trigger message 14 or the response message 16 from the server 15. The FQDN (Fully Qualified Domain Name) of the client 11B is "clientb.example.com", and the FQDN of the server 15 is "server.example.com". The client 11B of FIG. 6 is one example while the same may apply to the client 11A or a general client equipped with the present invention. Hereinafter, this procedure will be described along steps S31-S36.

Step S31: In response to the request from the client 11B, a single full-duplex communication channel with the server 15 is secured. Generally, the TCP (Transmission Control Protocol) connection (server port No.=110) is used. Thereafter, the communication is performed by transmitting a command from the client 11B and receiving a response from the server 15.

Step S32: The server 15 transmits the challenge character string CHL to the client 11B. As an algorithm, CRAM-MD5 is used. Although the BASE64 encode/decode part is different therefrom, the authentication procedure is basically the same as that of the challenge and response method described in FIG. 5. Therefore, the description of this part is omitted.

Step S33: The client 11B transmits to the server 15 a response RL prepared based on the password PW and the challenge character string CHL. The "APOP" indicates a command name, and a "userb" indicates a user name UN using the client 11B.

Step S34: The server 15 notifies the client 11B that the authentication is succeeded and a single mail is spooled. The authentication procedure is basically the same as the challenge and response method described in FIG. 5.

Step S35: The client 11B acquires the trigger message 14 or the response message 16.

Step S36: The client 11B requests the disconnection with the server 15 to end a series of procedures.

Trigger Message and Response Message

Formats 14F and 16F of the trigger message 14 and the response message 16 respectively shown in FIGS. 7 and 8 will now be described in detail.

Basic requirements of the trigger message format 14F and the response message format 16F are as follows:
(1) Any identifier is assigned in order to identify the trigger message 14 or the response message 16;
(2) Any corresponding identifier is assigned in order to associate the trigger message 14 with the response message 16;
(3) A public key is carried;
(4) Trust for the public key can be carried.

In the present invention, the above-mentioned requirements have only to be satisfied by expanding the conventional technology. It's specific methods exists in extremely various areas. Therefore, in this embodiment (1), by inserting the following header field originally defined into a mail header portion 14a of the trigger message 14, the trigger message 14 is identified. Also, in the embodiment (1), by inserting the following header field originally defined into the mail header portion 16a of the response message 16, the response message 16 is identified.

Trigger message identifier format: X-Certs-Auth: trigger-msg <Certs-Auth message ID>
Response message identifier format: X-Certs-Auth: respose-msg <Certs-Auth message ID>

"X-Certs-Auth" is a field name originally defined in the present invention. "<Certs-Auth message ID>" is a unique ID for associating the trigger message 14 with the response message 16. A client of a mail transmitter (client 1A in FIG. 1) determines a value, a client (client 1B in FIG. 1) of a mail receiver uses "Certs-Auth message ID" received as the response message 16. It is to be noted that a field name of an original extension header field is generally defined by a character string beginning with "X-".

In this embodiment (1), a format 17F of signature data (signedData (certs-only)) which is a format used upon carrying a public key certificate is used in S/MIME (Secure/Multipurpose Internet Mail Extensions) which carries the public key certificate. In the conventional technology, this format 17F has been used for carrying the public key certificate 97 (see FIG. 21A) already e-signed by the certification authority. However, in the present invention, the field 97d to which the signature of the certification authority is added is made blank. It is supposed that the signature is added after the user authentication by the server 15 of the ISP. This is a procedure specific to the present invention.

The S/MIME is diverted to the execution of PKCS#1, PKCS#7 and PKCS#10 of PKCS (Public-Key Cryptography Standards) concerning a processing method required for encoding and a data format. The data format 17F of the signedData (certs-only) 17 is defined in the PKCS#7. It is supposed that the formats 14F and 16F of the trigger message 14 and the response message 16 are described in a form defined in the PKCS#7.

It is to be noted that for the conventional technology corresponding to the S/MIME, other technologies such as PEM (Privacy Enhanced Mail), MOSS (MIME Object Security Services) and PGP (Pretty Good Privacy) exist. Although data formats are different from each other to some extent, the same processing as the embodiment (1) can be performed if the public key can be carried, and the present invention is not limited to the S/MIME.

Also, the mail header portion into which the trigger message identifier and the response message identifier are inserted is a header portion common to the e-mail, and does not depend on the technology of the above-mentioned S/MIME or the like.

FIG. 7 shows the format 14F of the trigger message 14, which is divided into a mail header portion 14a, a null line 14b and a mail body portion 14c.

The mail header portion 14a is composed of a plurality of header fields. The order of the header fields within the mail header portion 14a may be arbitrary. The header field is composed of a field name from a line head to ":" (colon) and a field body that follows.

In FIG. 7, the field body "0501171937.AAbb013@usera.server.example.com" of the header field of the trigger message format 14F is <Certs-Auth message ID>. While the same value as the message-ID is diverted in FIG. 7, if the mail transmitter assigns a unique ID, the value need not always be the same as the message-ID. In the conventional technology, RFC 822 requires that the message-ID be made an ID unique in a whole area of the Internet by the form of <local-part"@"domain>. Therefore, by applying this, Certs-Auth message ID is made in this embodiment (1). A general mail software of the client prepares the above-mentioned local-part by combining a generation date and time, a process ID and a generation No. or the like. Although "TriggerMessage" is made "Subject" in FIG. 7, it may be an arbitrary character string. "Mime-Version" indicates a version of MIME (Multipurpose Internet MailExtensions). The MIME is a message format standard of an e-mail, and is a standard expanded from RFC 822 which is a previous message format standard. In the MIME, the data contents of the mail body portion are defined by the header field (Content-Type, Content-Transfer-Encoding, Content-Disposition in FIG. 7).

Content-Type indicates a type of contents, i.e. a type of the mail body portions 14c and 16c. In the conventional technology, S/MIME has made Content-Type a pattern of the following Table 1 according to sage. In the table, this embodiment (1) uses an item 3 as the trigger message 14 and the response message 16. Also, in this embodiment (1), items 1 and 4 are used as an e-signed mail, an item 2 is used as an encoded mail, item 1 is included in item 2, and a nested structure is used as an encoded/e-signed mail.

As for the e-signed mail, the encoded mail, and the encoded/e-signed mail, they are basically the same as those in the conventional technology. However, it is preferable to assign e.g. a header field in the following so as to associate therewith the trigger message 14 and the response message 16 (not essential).

E-signed or encoded or encoded/e-signed message identifier format:
X-Certs-Auth:content-msg <Certs-Auth message ID>

TABLE 1

S/MIME TYPE

| ITEM | TYPE | SUB-TYPE | Smime VARIABLE | EXTENSION | USAGE |
|---|---|---|---|---|---|
| 1 | application | pkcs7-mime | signedData | .p7m | E-SIGNED MAIL |
| 2 | application | pkcs7-mime | envelopedData | .p7m | ENCODED MAIL |
| 3 | application | pkcs7-mime | certs-only | .p7c | CARRYING OF CERTIFICATE OR CRL (PRESENT INVENTION: TRIGGER MESSAGE/RESPONSE MESSAGE) |
| 4 | application | pkcs7-signature | — | .p7s | E-SIGNED MAIL (FORMAT USING pkcs7 FOR E-SIGNATURE PART OF mulitipart/signed TYPE OF MOSS) |
| 5 | application | pkcs10 | — | .p10 | (FORMAT REQUIRING CERTIFICATE ISSUE E.G. FROM CA |

It is to be noted that a file name (smime.p7c) is indicated as a variable of Content-Type in order to be used as a file name presented by a mail software of a client to a user when the user stores the mail body portion 14c separately as a file. The above-mentioned field name Content-Transfer-Encoding indicates an encode method of contents, i.e. mail body portion 14c. In FIG. 7, the mail body portion is encoded by BASE64. Also, the above-mentioned field name Content-Disposition indicates a method of presenting the contents to the user. An "attachment" in FIG. 7 indicates that presentation should be performed after receiving the instructions from the user.

Furthermore, the mail body portion 14c stores the result after the data of the signedData (certs-only) 17 defined by the PKCS#7 are further encapsuled by a ContentInfo format defined by the PKCS#7 (not shown) and then encoded by the BASE64. The signedData (certs-only) 17 will be described later based on FIGS. 9A and 9B. It is to be noted that the ContentInfo encapsuling the signedData (certs-only) 17 is for only encapsulating data and has no other roles.

In FIG. 8, the format 16F of the response message 16 is divided into a mail header portion 16a, a null line 16b, and a mail body portion 16c. The response message 16 is basically the same as the format 14F of the trigger message 14 except the following points.

As a field body of the field name "X-Certs-Auth", "response-msg" and <0501171937. AAbb013@usera.server.example.com> which is <Certs-Auth message ID> within the trigger message 14 received are assigned. As "References", a message-ID of the trigger message 14 is designated. However, the "References" has been generally performed in the conventional technology, and is not the technology of the present invention. The message-ID is different from that of the trigger message 14.

The mail body portion 16c shown in FIG. 8 stores the result after the data of the signedData (certs-only) 17 defined by the PKCS#7 are further encapsuled by the ContentInfo format defined by the PKCS#7 (not shown in FIG. 8), and then encoded by the BASE64. The signedData (certs-only) 17 will now be described in detail referring to FIGS. 9A and 9B.
SignedData (Certs-Only) Format FIG. 9A shows a signedData (certs-only) format 17F used for the trigger message 14 and the response message 16. The PKCS#7 defines the data format with ASN.1 (Abstract Syntax Notation One) (see FIG. 9B). ASN.1 is one of the languages defining a data structure. By defining a new data type by a combination of "built-in data type", a hierarchical data structure can be defined. The mail body portion 14c of the trigger message 14 and the mail body portion 16c of the response message 16 are the result of binary data in conformity with the ASN.1 encoded by BER (Basic Encoding Rules) or DER (Distinguished Encoding Rules) and further encoded by BASE64.

FIG. 9A is a diagram schematizing a format defined by the ASN.1 to make it easier to understand. The signedData 17 is a data string with sequence composed of a version 17a, digestAlgorithms 17b, contentInfo 17c, certificates 17d, crls 17e and signerInfos 17f. The "data string with sequence" means that data are stored in the above-mentioned order (version—signerInfos). The version 17a is a version of this format. The digestAlgorithms 17b will be described later. The contentInfo 17c is plaintext which is a signature object of the e-signed mail. The signedData 17 itself is a format for carrying the e-signed mail shown in Table 1, and at the same time a certificate corresponding to the e-signature can be carried. When only the certificate is carried, part of data are made blank, thereby enabling such a case to be supported. This is the signedData (certs-only) 17. Data to be made blank are presented by the standard. In this embodiment (1), only the certificate is carried. Therefore, the contentInfo 17c is made blank.

The ContentInfo 17c is composed of a contentType 17c1 which is a content type and a content 17c2 which is a content. Since the contentInfo 17c is blank, the contentType 17c1 and the content 17c2 are made blank. The certificates 17d are data assembly without sequence composed of a plurality of certificates 17d11 or extendedCertificates 17d12.

The certificate 17d11 indicates X.509 public key certificate 97 (see FIG. 21A), and the extendedCertificate 17d12 indicates the public key certificate which is X.509 public key certificate 97 defined by the PKCS#6 extended.

The signedData format 17F can originally store signatures of a plurality of persons or a plurality of signatures of the same person. Also, it can store a plurality of public key certificates 97 corresponding thereto.

In this embodiment (1), it is sufficient that a single user can transmit the trigger message 14 or the response message 16 basically. Therefore, both of X.509 public key certificate 97 and PKCS#6 extended public key certificate, i.e. two in total, or one of them is stored in the certificates 17d. Since it is sufficient to be able to carry the public key certificate 97 as mentioned above, the present invention does not limit the number.

Also, concerning the technology of the present invention, there is no difference between the X.509 public key certificate 97 and the PKCS#6 extension public key certificate. Also, as mentioned above, in the present invention a field 97d to which a signature of the certification authority is added is made blank, and the server 15 adds the signature after the user authentication. This is a procedure specific to the present invention. The crls 17e is made blank in this embodiment (1). The signerInfos 17f are data assembly without sequence storing a plurality of e-signature information for the above-mentioned content. Since only the public key certificate 97 is carried in this embodiment (1), the signerInfos 17f are made blank.

The digestAlgorithms 17b repeatedly store a plurality of digest algorithms as they are used in the signerInfos 17f. Within the signerInfos 17f whose detailed description is omitted in FIG. 9A, the same digestAlgorithms 17b is designated. Since the processing of the device is easy, the digestAlgorithms 17b is designated at the beginning of the format 17F. Since the signerInfos 17f is blank, the digestAlgorithms 17b is made blank. The digestAlgorithmIdentifier 17b1 is a data string with sequence composed of an algorithm 17b11 indicating an algorithm and parameters 17b12 which are it's parameters, which is made blank as a matter of course.

Embodiment (2)

FIGS. 10A and 10B

FIGS. 10A and 10B show messages used in an embodiment (2) of the e-mail transfer method and device according to the present invention. FIG. 10A shows a modification of the trigger message shown in FIG. 7, and FIG. 10B shows a modification of the response message shown in FIG. 8.

In the above-mentioned embodiment (1), the trust assigning portion 15c of the server 15 decodes the mail body portion 14c of the trigger message 14 and the mail body portion 16c of the response message 16, takes out the signedData (certs-only) 17, obtains the public key certificate 97 whose e-signature portion is blank from the data, verifies the certificate, and assigns the e-signature to the public key certificate 97. Also, the public key verifying portion 13b of the key management portion 13 of the client 11 verifies whether or not the e-signature of the ISP is assigned to the above-mentioned public key certificate 97.

Therefore, addition processing load of the e-signature of the ISP by the server 15 and the verification processing load of the e-signature of the ISP by the client 11 are heavy and require much time.

Accordingly, in the embodiment (2), as a method of assigning trust by the ISP, different from the above-mentioned embodiment (1), the trust assigning portion 15c of the server 15 assigns the trust assignment identifier to the mail header portion 14a of the trigger message 14 and the mail header portion 16a of the response message 16, thereby assigning the trust. Also, the embodiment (2) enables the public key verifying portion 13b of the client 11 to verify whether or not the trust assignment identifier is assigned to the mail header portion 14a of the trigger message 14 and the mail header portion 16a of the response message 16.

The basic arrangement of the client and server of this embodiment (2) is the same as that in FIGS. 3 and 4 of the above-mentioned embodiment (1). Hereinafter, only different portions will be described.

The trust assigning portion 15c of the server 15 in FIG. 4 assigns the trust assignment identifier (trusted by server's FQDN) by the following format to the mail header portion 14a of the trigger message 14 or the mail header portion 16a of the response message 16 in response to the input of the trigger message 14 or the response message 16.

Trigger message identifier format (trust assignment):
    X-Certs-Auth: trigger-msg <Certs-Auth message ID>
       trusted by server's FQDN Response message identifier format (trust assignment):
    X-Certs-Auth: response-msg <Certs-Auth message ID>
       trusted by server's FQDN It is to be noted that as the above-mentioned FQDN, an actual FQDN (e.g. server.example.com) of the server 15 is described.

It is to be noted that while the mail body portion 14c or 16c in FIG. 10A or 10B stores the result of the data of the signedData (certs-only) 17 encapsuled (not shown) by the contentInfo format defined by the PKCS#7 and encoded by the BASE64, the present invention is not limited to this as long as the public key can be carried.

The public key verifying portion 13b of the client 11 in FIG. 3 verifies the trust depending on whether or not the trust assignment identifier is assigned to the mail header portion 14a of the trigger message 14 or the mail header portion 16a of the response message 16, instead of whether or not the e-signature of the ISP is assigned to the public key certificate 97.

Also, as for the above-mentioned identifier, different from the e-signature, anyone can insert the identifier into the mail. Accordingly, the trust assigning portion 15c of the server 15 in FIG. 4 confirms whether or not the trust assignment identifier is assigned to the trigger message 14 or the response message 16 received. When it is assigned to the trigger message 14 or the response message 16, it is arranged that subsequent message transmission/reception is not performed. Thus, the e-mail to which the trust assignment identifier is assigned by a server other than the server 15 is prevented from being acquired by the mail transmitting/receiving users 11A and 11B.

As mentioned above in the embodiment (2), the addition processing load of the e-signature of the ISP by the server 15 and the verification processing load of the e-signature of the ISP by the client 11 in the embodiment (1) can be reduced.

Embodiment (3)

FIG. 11

Figure 11:
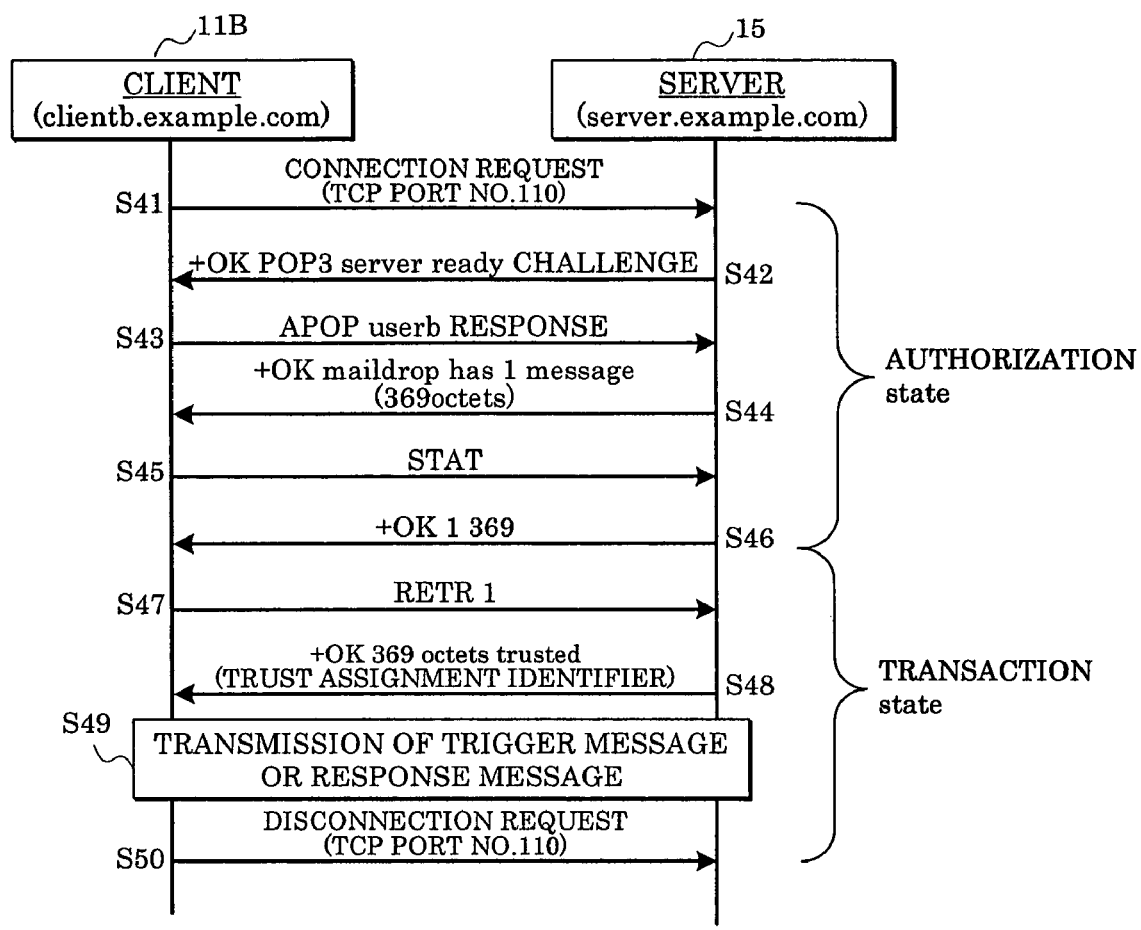
FIG. 11 shows a trust assignment procedure of an embodiment (3) of an e-mail transfer method and device according to the present invention, and is a sequence diagram corresponding to the modification of FIG. 6.

FIG. 11 shows a procedure of the trust assignment of an embodiment (3) of the e-mail transfer device according to the present invention. This corresponds to a modification of FIG. 6.

As described in the above-mentioned embodiment (2), the addition processing load of the e-signature of the server 15 and the verification processing load of the e-signature of the client 11 are heavy and take much time in the embodiment (1).

Therefore, in the embodiment (3), as a method of assigning trust by the ISP, different from the above-mentioned embodiment (1), when the server 15 of the ISP acquires the trigger message 14 or the response message 16 by the client 11, the server 15 assigns the trust to the client 11 by transmitting the trust assignment identifier.

In FIG. 11, steps S41-S44 are the same as steps S31-S34 in FIG. 6. Hereinafter, only the different steps will be described. It is to be noted that the client 11B in FIG. 6 is indicated as the client 11.

Step S45: The client 11 requests the transition to the TRANSACTION state from the server 15. The TRANSACTION state is a state of transmitting/receiving mail data. At this step, the state transitions from the AUTHORIZATION state to the TRANSACTION state.

Step S46: It is indicated that the above-mentioned request of step S45 is acknowledged (+OK 1 369). "1" is a message number spooled by the server 15. "369" is a total capacity (octet) of the messages spooled by the server 15.

Step S47: The client 11 requests to acquire a message whose message-number is 1 (RETR 1). The message-number is assigned to the message spooled by the server 15 at the beginning of this transmission/reception procedure, and begins with No. 1.

Step S48: It is indicated that the above-mentioned request of step S47 is acknowledged (+OK). Since this message is one to which the trust is assigned, the server 15 transmits the trust assignment identifier "trusted" to the client 11 as shown in FIG. 11.

Step S49: The trigger message 14 or the response message 16 is transmitted.

Step S50: The transmission at above-mentioned steps S47 and S48 as well as for the trigger message 14 or the response message 16 at step S49 is performed repeatedly per message. Therefore, unless the trust is assigned to the subsequent message, "trusted" is not assigned. After transmitting/receiving a required message, the connection is disconnected.

The basic arrangement of the client and the server in the embodiment (3) is the same as that in FIGS. 3 and 4 of the above-mentioned embodiment (1). Only the different parts will now be described.

The trust assigning portion 15c of the server 15 in FIG. 4 assigns to the trigger message 14 or the response message 16 the trust as internal data closed within the server 15. The internal data are not outputted from the server 15.

Also, the trigger message acquisition request responding portion 15d or the response message acquisition request responding portion 15f of the server 15 in FIG. 4 determines that the trust is assigned to the trigger message 14 or the response message 16 by the above-mentioned internal data, and by the above-mentioned procedure as shown in FIG. 11 the trust assignment identifier is transmitted to the client 11.

When the trigger message acquiring portion 12c or the response message acquiring portion 12f of the client 11 in FIG. 3 identifies that the trust is assigned by the above-mentioned procedure shown in FIG. 11, the fact that the trust has already been assigned is notified to the public key verifying portion 13b together with the public key. The public key verification result of the public key verifying portion 13b of the client 11 is transmitted according to the notification.

As mentioned above, in this embodiment (3), when the client 11 acquires the trigger message 14 or the response message 16, the server 15 of the ISP assigns the trust by transmitting the trust assignment identifier to the client 11. Thus, the addition processing load of the e-signature by the server 15 of the embodiment (1) and the verification processing load of the e-signature by the client 11 can be reduced.

Embodiment (4)

FIGS. 12-14

In the above-mentioned embodiment (1), in order for the mail transmitting user 11a to transmit encoded information to the mail receiving user 11b, it is required for the mail transmitting user 11a to transmit the encoded/e-signed mail to the mail receiving user 11b after transmitting/receiving the trigger message 14 and the response message 16 between the mail transmitting user 11a and the mail receiving user 11b. However, when it is sufficient for the mail transmitting user 11a to request the encoded information from the mail receiving user 11b, it becomes unnecessary for the mail transmitting user 11a to transmit the encoded/e-signed mail to the mail receiving user 11b.

Therefore, in an embodiment (4), plaintext requesting the encoded/e-signed mail is added to the trigger message and the encoded/e-signed mail is added to the response message.

Figure 12:
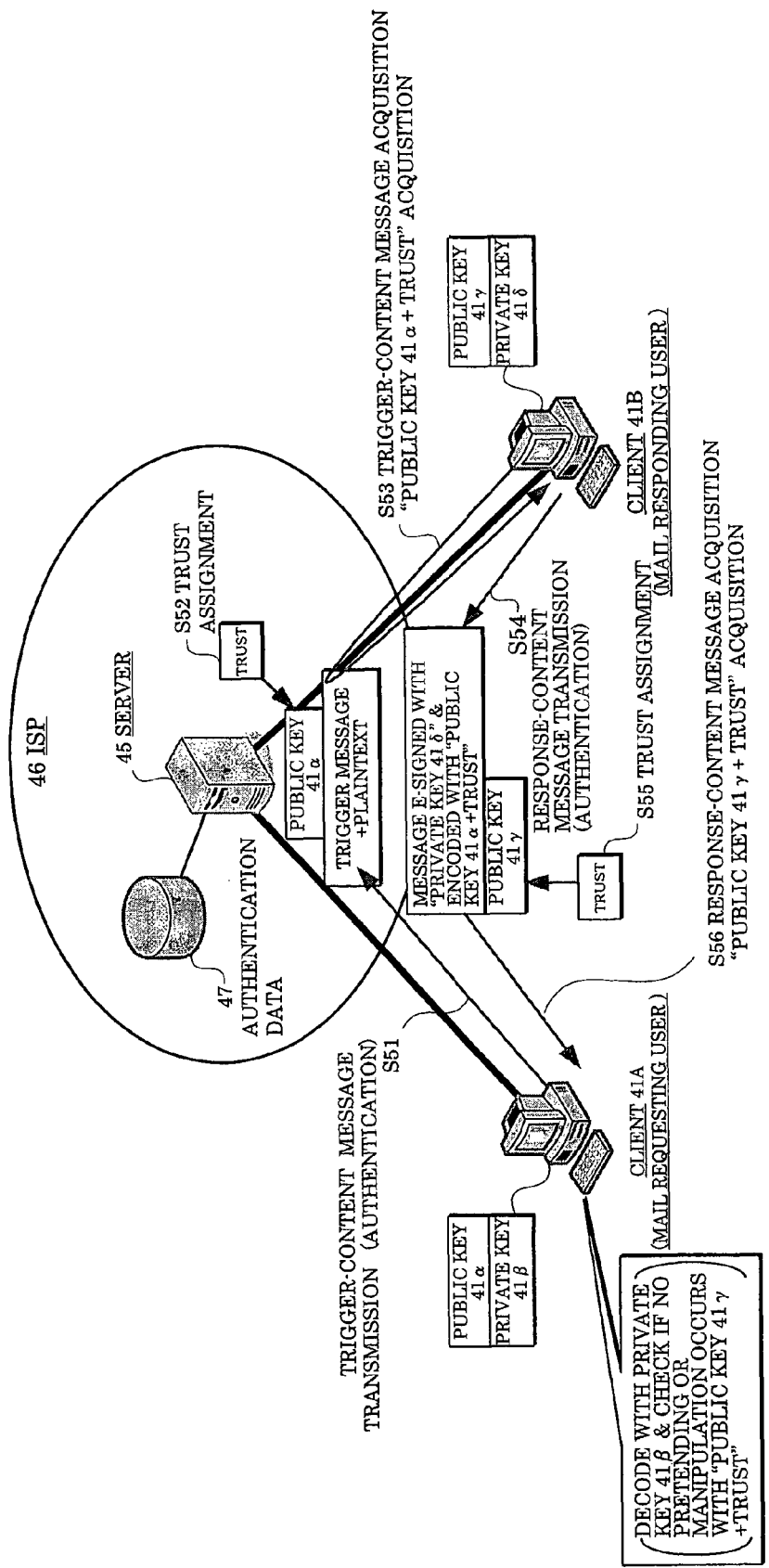
FIG. 12 is a block diagram schematically showing an embodiment (4) of an e-mail transfer method and device according to the present invention.
Figure 13:
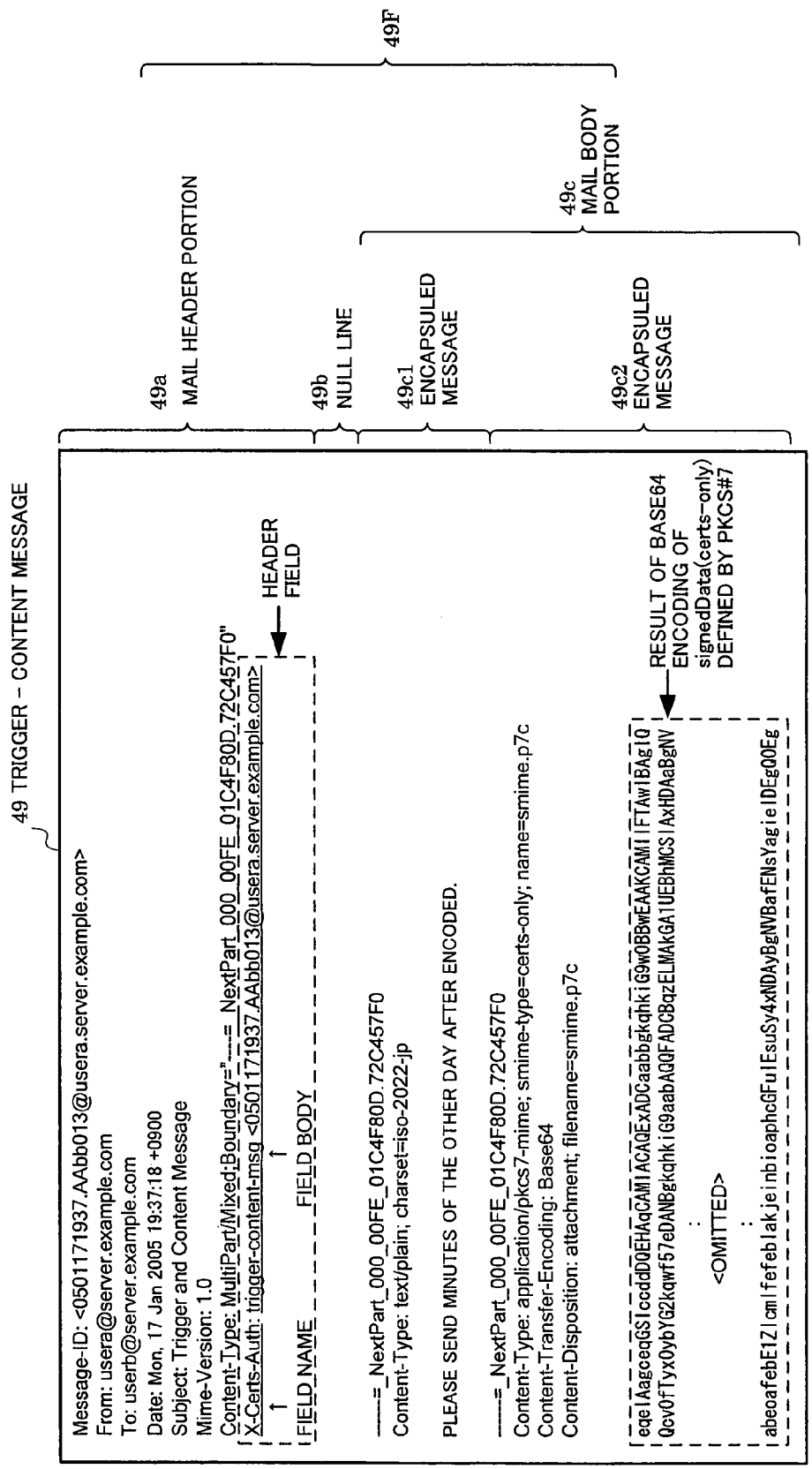
FIG. 13 shows a format diagram of a trigger-content message in an embodiment (4) of an e-mail transfer method and device according to the present invention, and is a diagram corresponding to the modification of FIG. 7.
Figure 14:
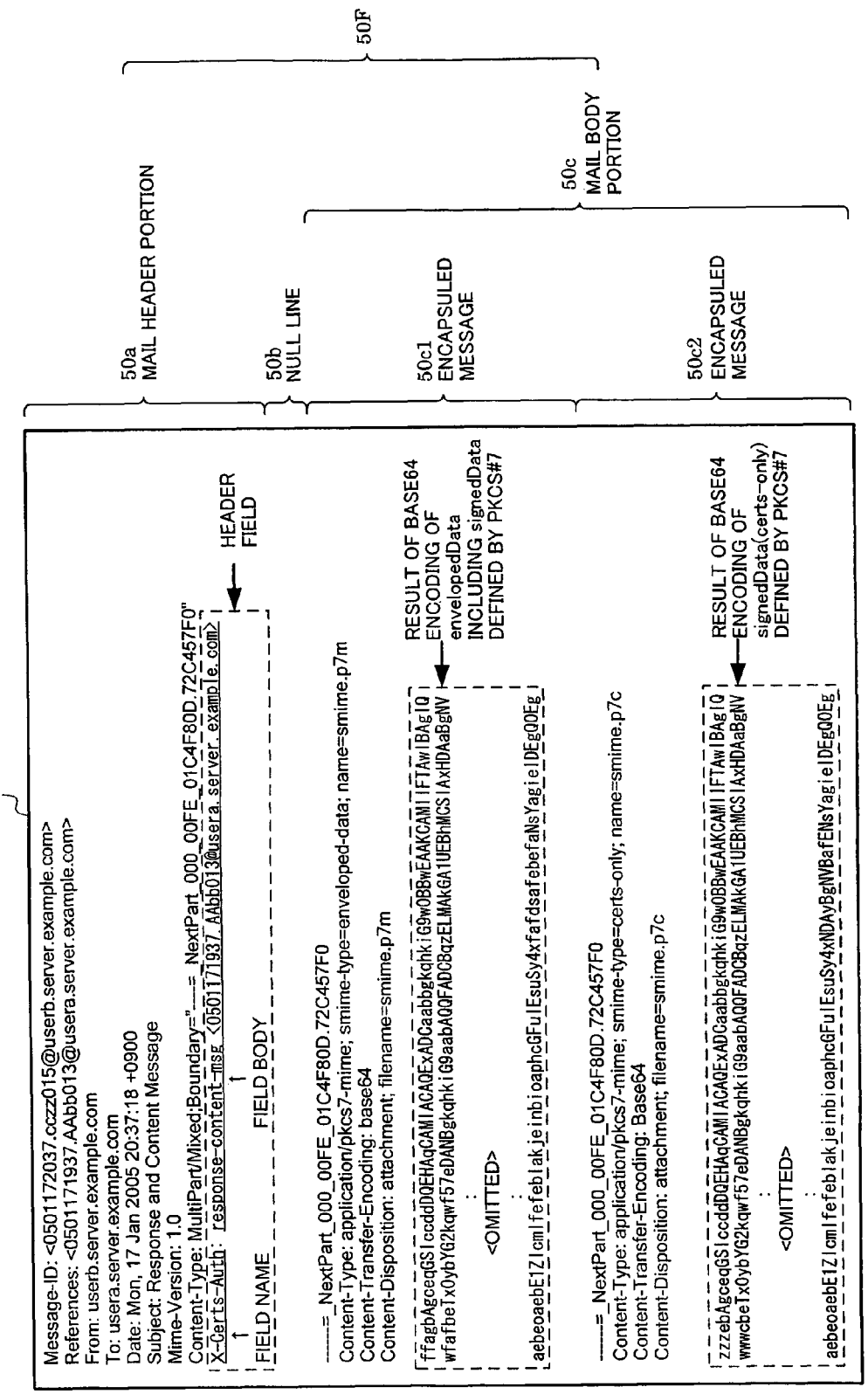
FIG. 14 shows a format diagram of a response-content message in an embodiment (4) of an e-mail transfer method and device according to the present invention, and is a diagram corresponding to the modification of FIG. 8.

FIG. 12 shows a schematic diagram of the embodiment (4) of the e-mail transfer method and device according to the present invention. FIG. 13 shows a trigger-content message of the embodiment (4), which corresponds to a modification of FIG. 7. FIG. 14 shows a response-content message of the embodiment (4), which corresponds to a modification of FIG. 8.

In FIG. 12, a mail requesting user (client 41A) is a user who requests some information from a mail responding user (client 41B). This request intension itself is not secret information which specifically requires encoding. The mail responding user 41B is a user who responds the information to the mail requesting user 41A in response to the request from the mail requesting user 41A. The responded information is secret information which requires encoding. Accordingly, by transmitting/receiving the mail from the mail responding user 41B to the mail requesting user 41A, a series of procedures is completed.

Hereinafter, along the message order of FIG. 12, points different from FIG. 1 will be mainly described. Other points are the same as FIG. 1.

Step S51: The mail requesting user 41A transmits a trigger-content message 49 to a mail server 45 of an ISP 46 so that the mail requesting user 41A may obtain a public key 41γ and information requested of the mail responding user 41B. At this time, the mail requesting user 41A attaches information contents requested with plaintext not encoded. The information content requested is, as shown in FIG. 13, e.g. "Please send minutes of the other day after encoded.".

Step S52: By performing a user authentication by using user authentication data 47 of the ISP 46 in the above-mentioned step S51, the trust is assigned to the trigger-content message 49.

Step S53: The mail responding user 41B acquires the trigger-content message 49. The mail responding user 41B obtains a public key 41α of the mail requesting user 41A to which the trust is assigned (guaranteed) and the information contents requested by the mail requesting user 41A. The mail responding user 41B verifies whether or not the trust of the public key 41α obtained is assigned.

Step S54: The mail responding user 41B transmits to the server 45 the public key 41γ and a response-content message 50 including a message (=requested information) e-signed with a private key 41δ of the mail responding user 41B and encoded with the public key 41α of the mail requesting user 41A Step S55: The server 45 of the ISP 46 performs the user authentication by using the user authentication data 47 of the ISP 46 in the above-mentioned step S54, thereby assigning the trust to the public key 41γ of the mail responding user 41B.

Step S56: The mail requesting user 41A acquires the response-content message 50. The mail requesting user 41A obtains the public key 41γ of the mail responding user 41B to which the requested information and the trust are assigned.

It is to be noted that as a method of assigning the trust to the embodiment (4), methods described in the embodiments (1), (2) and (3) can be used. Also, different from the above-mentioned embodiment (1), in order to indicate that the requested information (=contents) is included, a trigger-content message identifier format and a response-content message identifier format are made as follows:

Trigger-content message identifier format:
    X-Certs-Auth: trigger-content-msg <Certs-Auth message ID>

Response-content message identifier format:
    X-Certs-Auth: response-content-msg <Certs-Auth message ID>

In FIG. 13, a trigger-content message format 49F is divided into a mail header portion 49a, a null line 49b and a mail body portion 49c. A trigger-content message identifier is described in the mail header portion 49a, and the requested information and the public key certificate 97 are hierarchically stored in the mail body portion 49c as encapsuled messages 49c1 and 49c2 respectively.

"Content-Type: MultiPart/Mixed" of the mail header portion 49a indicates that the mail body portion 49c is composed of a plurality of encapsuled messages. Boundary="- - -=_NextPart_000_00FE 01C4F80D.72C457F0" indicates that the border of the encapsuled message is indicated by a character string which combines a character string "- -" with a character string "- - - -=_NextPart_000_00FE_01C4F80D.72C457F0". After the border character string, the header portion 49a and the body portion 49c are similarly described. Concerning the encapsuled message 49c1, "Content-Type: text/plain; charset=iso-2022-jp" indicates that the body portion of the encapsuled message 49c1 is text described in Japanese. In the encapsuled message 49c2, the result of signedData (certs-only) the same as FIG. 7 and further encapsuled by the contentInfo format (not shown) and encoded by the BASE64 is stored.

In FIG. 14, a response-content message format 50F is divided into a mail header portion 50a, a null line 50b and a mail body portion 50c. The response-content message identifier is described in the mail header portion 50a. The encoded/e-signed message and the public key certificate 97 are hierarchically stored in the mail body portion 50c as the encapsuled messages 50c1 and 50c2 respectively.

The e-signature is placed to minutes (=requested information) with the signedData format 17F shown in the item 1 of Table 1, the result is further encoded by envelopedData shown in the item 2 of Table 1, and the result is further encapsuled (not shown) by the contentInfo format. The encapsuled message 50c1 stores the result encoded by the BASE64. Accordingly, smime-type is made enveloped-data which is a final data format. Since the encoded/e-signed message format is the same as that of the conventional technology, a detail format corresponding to FIG. 9A is omitted. The encapsuled message 50c2 stores the result of the signedData (certs-only) the same as that in FIG. 8 further encapsuled by the contentInfo format (not shown) and encoded by the BASE64.

In the above-mentioned embodiment (4), as mentioned above, since plaintext requesting the encoded/e-signed mail is added to the trigger-content message 49, and the encoded/e-signed mail is added to the response-content message 50, the number of messages transmitted/received between the mail requesting user and a mail responding user can be reduced.

Embodiment (5)

FIG. 15

Figure 15:
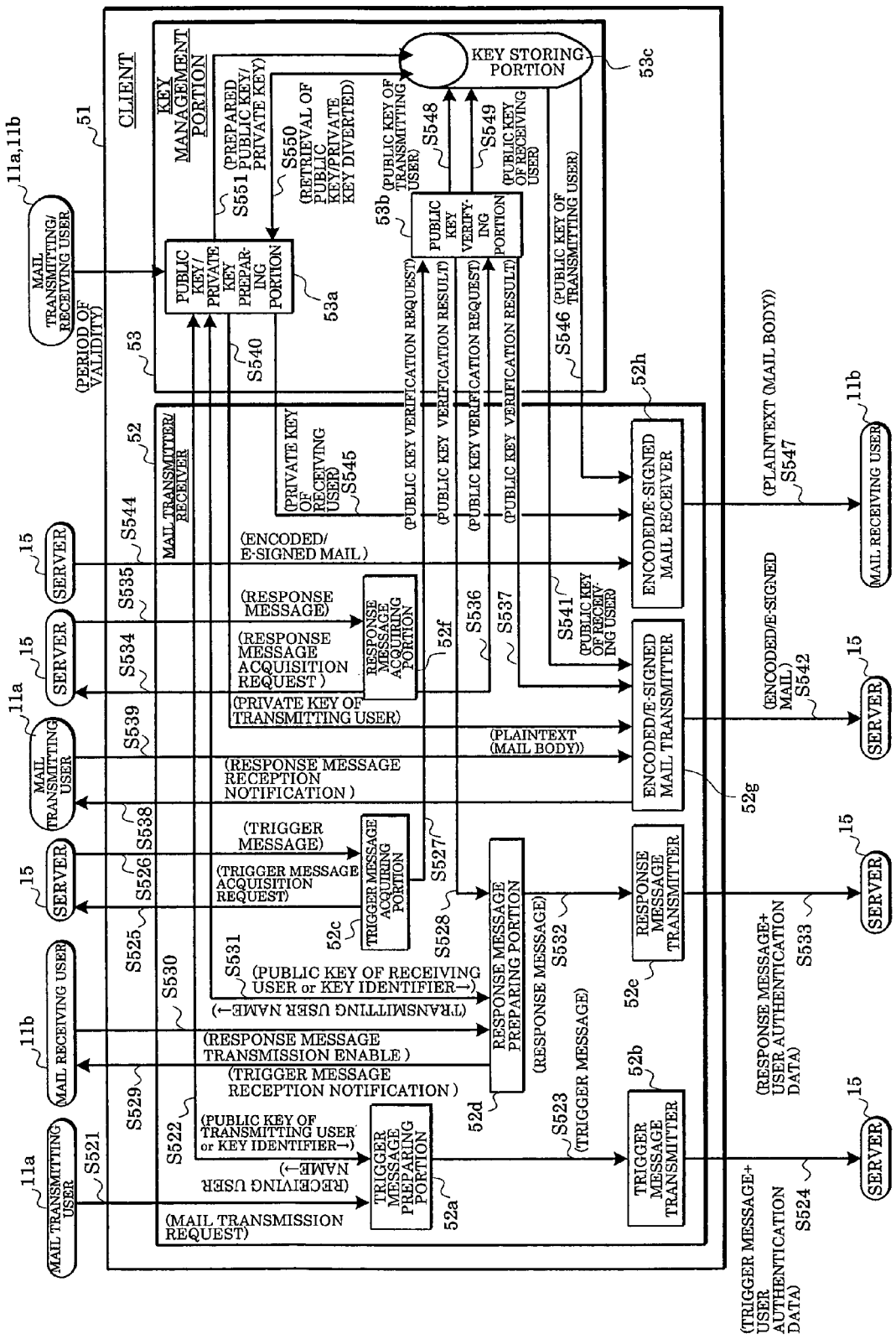
FIG. 15 is a block diagram showing an arrangement of a client in an embodiment (5) of an e-mail transfer method and device according to the present invention, and corresponds to the modification of FIG. 3.

FIG. 15 shows a client of an embodiment (5) of the e-mail transfer method and device according to the present invention, which corresponds to a modification of FIG. 3.

In the above-mentioned embodiment (1), the key storing portion 13c of the client 15 temporarily stores the public keys 11α and 11γ during a series of transmission/reception procedures. Even if the transmission destination is the same as before, it has been required to attach the public key certificate 97 to the trigger message 14 and the response message 16.

Therefore, in the embodiment (5), if the transmission destination is the same as before, a certificate series No. 972 of the public key certificate 97 is added as a key identifier to the trigger message identifier format and the response message identifier format, thereby enabling the public key certificate 97 of the destination stored by the client 51 to be designated.

The basic arrangement of the client of the embodiment (5) is the same as that in FIG. 3 in the above-mentioned embodiment (1). Hereinafter, only different parts will be described.

It is to be noted that the certificate series No. 972 can be uniquely prepared per certificate by the client 51. For example, the client 51 can prepare it based on the message-ID of the e-mail.

Trigger message identifier format:
    X-Certs-Auth: trigger-msg <Certs-Auth message ID>
    certs=certificate serial No.

Response message identifier format:
    X-Certs-Auth: response-msg <Certs-Auth message ID>
    certs=certificate serial No.

In FIG. 15, when a trigger message preparing portion 52a of the client 51 transmits a name of a opponent mail receiving user to a public key/private key preparing portion 53a (at step S522) upon preparing the trigger message 14. When the mail receiving user 11b is an opponent user to which no trigger message 14 has been transmitted previously, the trigger message preparing portion 52a obtains the public key 11α of the mail transmitting user 11a. When the mail receiving user 11b is an opponent user to which the trigger message 14 has been transmitted previously, the trigger message preparing portion 52a obtains the key identifier.

Similarly, a response message preparing portion 52d transmits to the public key/private key preparing portion 53a the name of the opponent mail transmitting user, and the response message preparing portion 52d obtains the public key 11γ of the mail receiving user 11b or the key identifier (at step S531).

The public key/private key preparing portion 53a receives the mail transmitting/receiving user name, and the key storing portion 53c retrieves the public keys 11α and 11γ with the user name (at step S550). In the presence of corresponding public keys 11α and 11γ after the retrieval, the public key/private key preparing portion 53a transmits the key identifier (at steps S522 and S531). Also, at this time <Certs-Auth message ID> is added to the corresponding entry of the key storing portion 53c.

In the absence of the corresponding public keys 11α and 11γ after the retrieval, the public key/private key preparing portion 53c prepares the public key/private key to be stored in the key storing portion 53c (at step S551) and the public keys are transmitted (at steps S522 and S531). Also, at this time, <Certs-Auth message ID> is added to the corresponding entry of the key storing portion 53c. When preparing the public key/private key, the public key/private key preparing portion 53a prepares the public key certificate 97 according to the period of validity 97b preliminarily designated by the mail transmitting/receiving users 11a and 11b.

When obtaining the private key 11β of the mail transmitting user 11a or the public key 11γ of the mail receiving user 11b (at steps S540 and S541), the encoded/e-signed mail transmitter 52g specifies the private key 11β or the public key 11γ used based on the above-mentioned <Certs-Auth message ID>.

Similarly, when obtaining the public key 11α of the mail transmitting user 11a or the private key 11δ of the mail receiving user 11b (at steps S545 and S546), an encoded/e-signed mail receiver 52h specifies the public key 11α or the private key 11δ used based on the above-mentioned <Certs-Auth message ID>.

Concerning a pair of public key/private key stored, the key storing portion 53c stores the keys for the period of validity 97b described in the public key certificate 97 designated by the mail transmitting/receiving users 11a and 11b, and discards the keys whose period of validity 97b has expired.

In the above-mentioned embodiment (5), if the destination is the same as before, the certificate series No. 972 of the public key certificate 97 is added as an identifier to the trigger message identifier format and the response message identifier format. Therefore, since it is not required to attach the public key certificate 97 to the trigger message 14 and the response message 16, there is an effect of reducing the message data amount.

Embodiment (6)

FIG. 16

Figure 16:
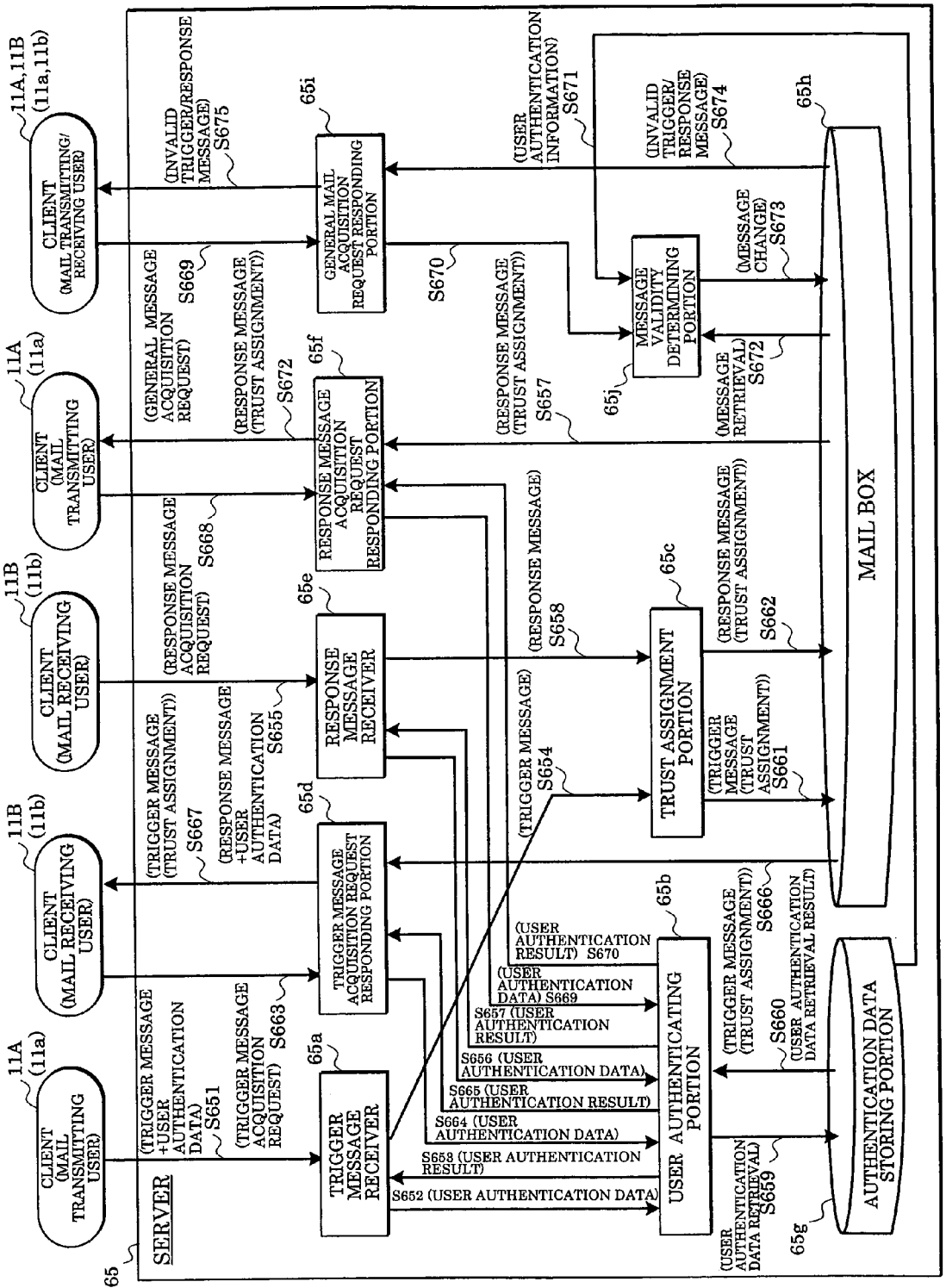
FIG. 16 is a block diagram showing an arrangement of a server in an embodiment (6) of an e-mail transfer method and device according to the present invention, and is a diagram corresponding to the modification of FIG. 4.

FIG. 16 shows a server in an embodiment (6) of the e-mail transfer method and device according to the present invention, which corresponds to a modification of FIG. 4.

In the above-mentioned embodiment (1), there is a case where the server 15 receives the trigger message 14 and the response message 16 which are no longer valid. Therefore, the embodiment (6) enables a server 65 to return the trigger message 14 and the response message 16 which are no longer valid.

The basic arrangement of the server in the embodiment (6) is the same as that in FIG. 4 of the above-mentioned (1). Hereinafter, only different parts will be described.

A trigger message 14 which is no longer valid (hereinafter, referred to as invalid trigger message) will now be described.

The trigger message 14 which is no longer valid is:
(1) a message in which the trust of the mail transmitting user 11a is reduced (non-payment of fee etc.) before acquiring the trigger message of the mail receiving user 11b;
(2) a message whose period of validity of the public key certificate 97 attached has expired before acquiring the trigger message of the mail receiving user 11b; and
(3) a message (requiring immediacy etc.) in which the period of validity of information to be encoded and transmitted has expired before acquiring the trigger message of the mail receiving user 11b.

It is to be noted that the response message 16 which is no longer valid (hereinafter, referred to as invalid response message) is the same as the above-mentioned trigger message 14.

As for the period of validity in the above-mentioned (3), the mail transmitting/receiving users 11a and 11b designate an identifier (expire=expiration (date and time)) by the following formats in the message headers 14a and 16a, so that a message validity determining portion 65j in the server 65 determines based on the identifier.

Trigger message identifier format:
    X-Certs-Auth: trigger-msg <Certs-Auth message ID>
        expire=expiration (date and time)
Response message identifier format:
    X-Certs-Auth: response-msg <Certs-Auth message ID>
        expire=expiration (date and time)

In FIG. 16, when a general mail acquisition request responding portion 65i in the server 65 receives a general mail acquisition request from the clients (mail transmitting/receiving users) 11A and 11B (at step S669), the general mail acquisition request responding portion 65i outputs a reception signal to the message validity determining portion 65j (at step S670). The message validity determining portion 65j utilizes user authentication data of a user authentication data storing portion 65g (at step S671), and retrieves the trigger message 14 or the response message 16 which is no longer valid as mentioned above from a mail box 65h (at step S672).

When the message validity determining portion 65j determines that the trigger message 14 and the response message 16 are not valid, the message header 14a of the trigger message 14 and the mail header portion 16a of the response message 16 are changed (at step S673), so that an invalid trigger message 14 or response message 16 is transmitted to the general mail acquisition request responding portion 65i (at step S674). The general mail acquisition request responding portion 65i returns the invalid trigger message 14 or response message 16 to the clients (mail transmitting/receiving users) 11A and 11B (at step S675).

It is to be noted that a general message acquisition request of the general mail acquisition request responding portion 65i is a mail acquisition by a usual POP/IMAP etc., and it is not by a processor specific to this embodiment. Therefore, in the embodiment (1) of FIG. 4, since the processor is not directly related to the present invention, it is hereby omitted.

As mentioned above, in the embodiment (6), the server 65 can return to the transmitting/receiving users 11a and 11b the trigger message 14 and the response message 16 which are no longer valid together with a general e-mail to which encoding is not performed. Accordingly, there is an effect that efficiency of the trigger message 14 and the response message 16 can be reflected in the mail transmitting/receiving users 11a and 11b in further real time.

Embodiment (7)

FIG. 17

Figure 17:
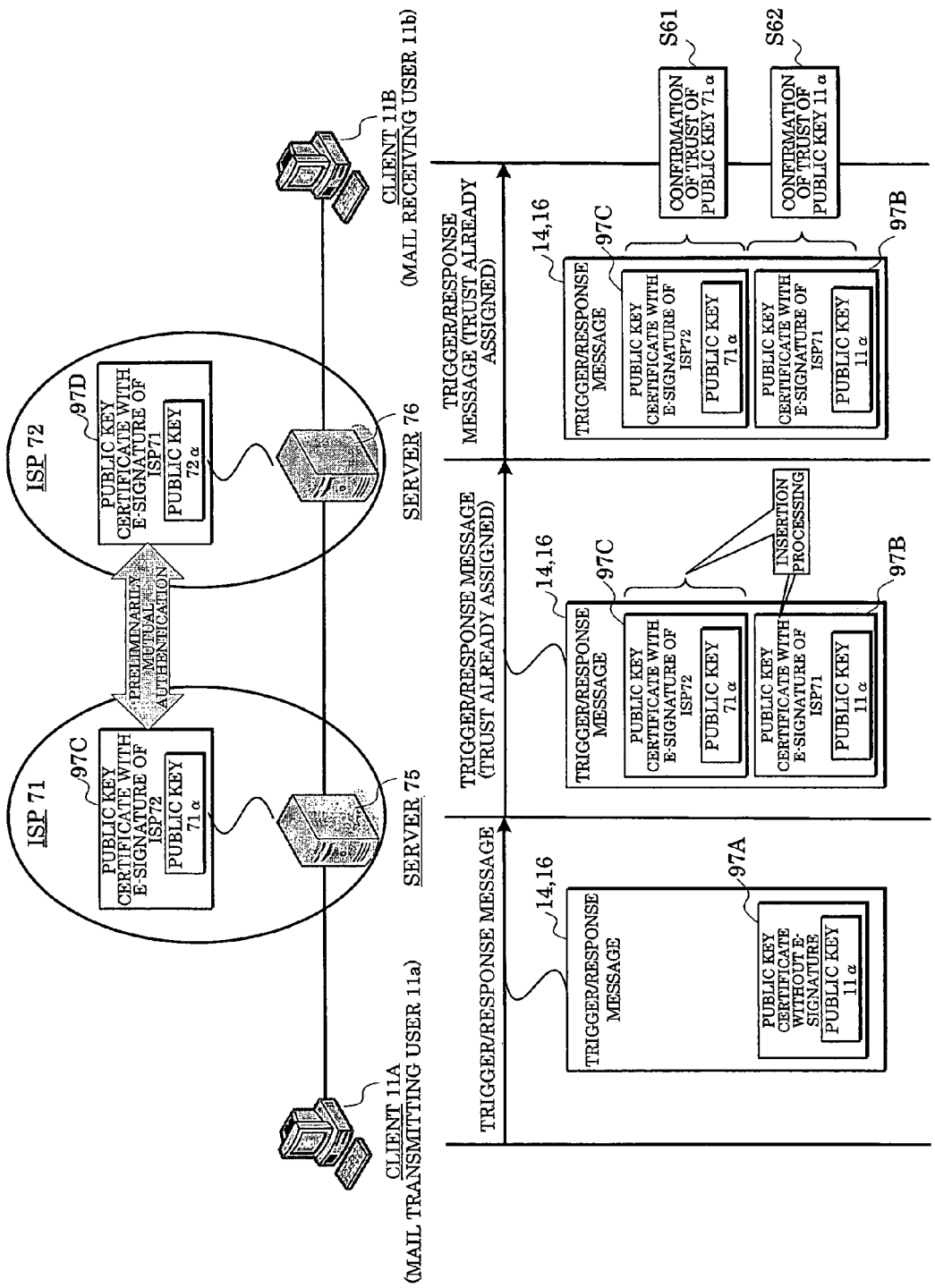
FIG. 17 is a block diagram schematically showing an embodiment (7) of an e-mail transfer method and device according to the present invention.

FIG. 17 shows a schematic diagram of an embodiment (7) of the e-mail transfer method and device according to the present invention.

In this embodiment (7), instead of the server 15 of the above-mentioned embodiment (1), servers 75 and 76 of different two ISPs 71 and 72 are used, and public key certificates 97C and 97D of the destinations ISPs 72 and 71 mutually authenticated are inserted into the trigger message 14 or the response message 16.

In FIG. 17, the client 1A belongs to the ISP 71, and the client 11B belongs to the ISP 72. It is to be noted that the public key 11α is the public key of the client 11A. The ISP 71 and the ISP 72 preliminarily exchange mutual authentication trusting mutual mail transmitting/receiving user. Thus, the ISP 71 obtains the e-signed public key certificate 97C of the ISP 72 including its own public key 71α, and the ISP 72 obtains the e-signed public key certificate 97D of the ISP 71 including its own public key 72α.

When receiving the trigger message 14 or the response message 16, the server 75 of the ISP 71 inserts not only the e-singed public key certificate 97B of the ISP 71 including the public key 11α but also the e-signed public key certificate 97C of the ISP 72 including the public key 71α into the message to be transmitted if the destination is the ISP 72. The client 11B having received the trigger message 14 or the response message 16 through the server 76 confirms the trust of the public key 71α of the server 75 by the e-signature of the ISP 72 to which the client 11B itself belongs at step S61. At step S62, the client 11B confirms the trust of the public key 11α of the client 11A by the e-signature of the ISP 71 already trusted.

Thus, the client 11B can acquire the public key 11α to which the trust is assigned.

Conversely, if the client 11A acquires the public key 11γ of the client 11B to which the trust is assigned, the encoded/e-singed mail can be transmitted/received by the same method as a prior art method.

It is to be noted that as shown in FIG. 17, the method of concatenating trust between the ISPs by adding the public key certificate 97B and the public key certificate 97C to the list has been already known.

As mentioned above, in the embodiment (7), the servers 75 and 76 of the ISPs 71 and 72 identify the trigger message 14 or the response message 16, and insert the public key certificates 97C and 97D of the destination ISPs 72 and 71 into the trigger message 14 or the response message 16 according to the destination. Accordingly, there is an effect that the encoded/e-signed mail can be transmitted/received between the clients 11A and 11B belonging to the different ISPs 71 and 72.

Embodiment (8)

Figure 18A:
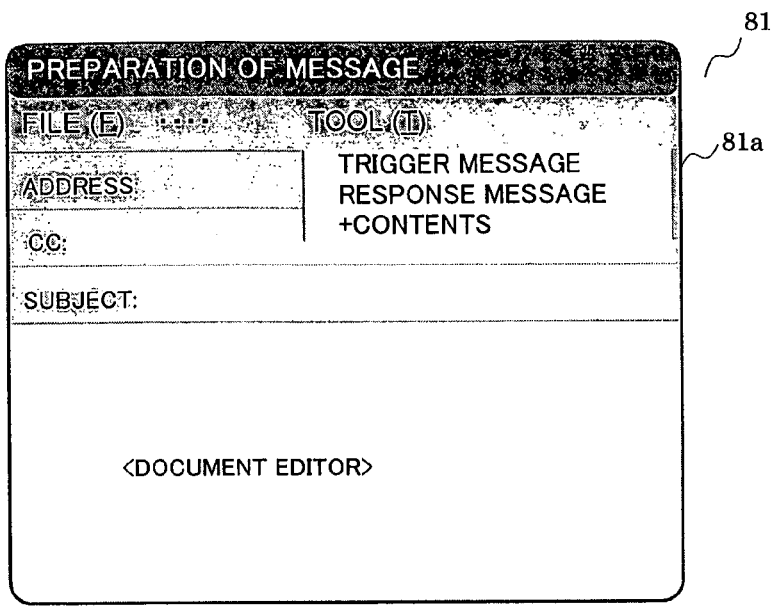
Figure 18B:
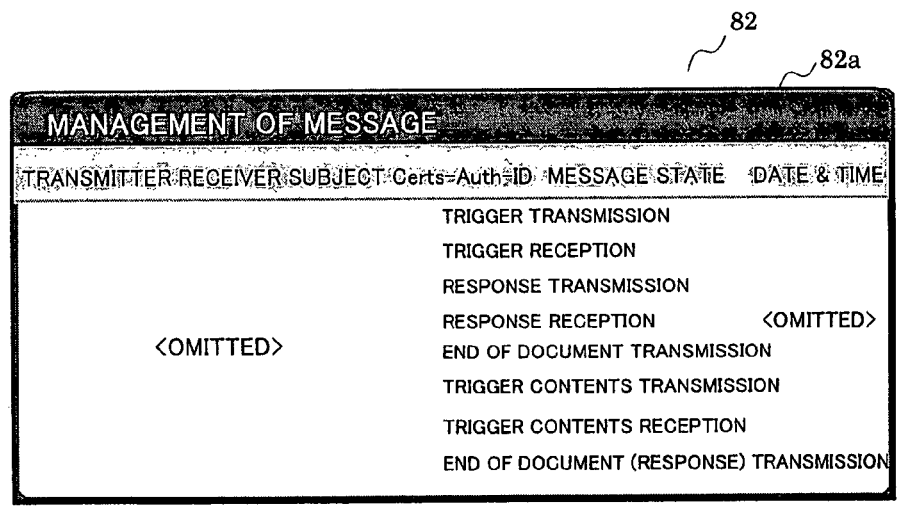

FIGS. 18A and 18B

FIGS. 18A and 18B show message screens of a user interface of the embodiment (8) of the e-mail transfer method and device according to the present invention. FIG. 18A shows a message preparing screen of the message preparing user interface, and FIG. 18B shows a message management screen of a message management user interface.

In the embodiment (8), the client 11 in the above-mentioned embodiment (1) is further provided with a message preparing user interface 81 or a message management interface 82. The message preparing user interface 81 has a message preparing screen 81a for designating a message. The message management interface 82 has a message management screen 82a for displaying a message state.

In FIG. 18A, the message preparing screen 81a is provided with a message designation of the trigger message 14, the response message 16, and "+contents" with a menu designation form of "tool (T)". It is to be noted that the above-mentioned menu designation form may be a designation form by a button.

It is to be noted that the message preparing user interface 81 of this embodiment (8) may have an interface which can designate the above-mentioned message regardless of a difference of parts of a GUI (Graphical User Interface).

In FIG. 18B, the message management screen 82a displays a message state such as a trigger transmission, a trigger reception, a response transmission, a response reception, a body transmission completion, a trigger content transmission, a trigger content reception, a body (response) transmission completion with other attributes (mail transmitter, mail receiver, or the like) in a list form. In the message management screen 82a, a Certs-Auth message ID and an entry correspond to each other in a one-to-one relationship. By performing a series of message procedures, a message state is updated. When an entry of the message management screen 82a is designated (e.g. clicked), a transmission confirmation screen or a message preparation screen of a subsequent message is displayed, so that an appropriate message according to a state can be prepared by the mail transmitting/receiving user.

As mentioned above, in the embodiment (8), there is an effect that the mail transmitting/receiving user can grasp a relationship of a series of messages (trigger message-response message-encoded/e-singed message) and can prepare an appropriate message according to the state.

What is claimed is:

1. An e-mail transfer method of an e-mail transfer device for transferring an e-mail by a public key encoding method between an e-mail transmission device and an e-mail reception device comprising:

receiving from the e-mail transmission device a trigger message to which user authentication data and a public key are added;

authenticating the user authentication data;

assigning a trust assignment identifier to the public key within the trigger message to be transmitted to the e-mail reception device and triggering a response message to be transmitted by the e-mail reception device when the user authentication data within the trigger message are authenticated by the authenticating;

receiving from the e-mail reception device the response message to which user authentication data and a public key are added; and assigning a trust assignment identifier to the public key within the response message to be transmitted to the e-mail transmission device and triggering the e-mail to be transmitted to the e-mail reception device by the e-mail transmission device when the user authentication data within the response message are authenticated by the authenticating, wherein the e-mail transmission device transmits the trigger message to the e-mail transfer device, acquires from the e-mail mail transfer device the response message from the e-mail reception device, verifies whether or not the trust assignment identifier is assigned to the public key within the response message, and transmits to the e-mail reception device an e-mail electronically signed with a private key of the e-mail transmission device and encoded with a public key of the e-mail reception device to which the trust assignment identifier is assigned when it is verified that the trust assignment identifier is assigned to the public key within the response message.

2. The e-mail transfer method as claimed in claim 1, wherein the e-mail transmission device transmits to the e-mail reception device an e-mail electronically signed with a private key of the e-mail transmission device and encoded with the public key of the e-mail reception device assigned with the trust assignment identifier of the e-mail transfer device, and the e-mail reception device decodes the encoded e-mail with a private key of the e-mail reception device and checks the electronic signature of the decoded e-mail with the public key of the e-mail transmission device having verified that the trust assignment identifier is assigned.

3. An e-mail transfer device for transferring an e-mail by a public key encoding method between an e-mail transmission device and an e-mail reception device comprising:

a trigger message receiver that receives from the e-mail transmission device a trigger message to which user authentication data and a public key are added;

a user authentication portion that authenticates the user authentication data;

a trigger message trust assignment portion that assigns a trust assignment identifier to the public key within the trigger message to be transmitted to the e-mail reception device and triggering a response message to be transmitted by the e-mail reception device when the user authentication data within the trigger message are authenticated by the user authentication portion;

a response message receiver that receives from the e-mail reception device the response message to which user authentication data and a public key are added; and a response message trust assignment portion that assigns a trust assignment identifier to the public key within the response message to be transmitted to the e-mail transmission device and triggers the e-mail to be transmitted to the e-mail reception device by the e-mail transmission device when the user authentication data within the response message are authenticated by the user authentication portion, wherein the e-mail transmission device has a trigger message transmitter that transmits the trigger message to the e-mail transfer device, a response message acquisition portion that acquires from the e-mail mail transfer device the response message from the e-mail reception device, a response message trust assignment verification portion that verifies whether or not the trust assignment identifier is assigned to the public key within the response message, and a mail transmitter that transmits to the e-mail reception device an e-mail electronically signed with a private key of the e-mail transmission device and encoded with a public key of the e-mail reception device to which the trust assignment identifier is assigned when the response message trust assignment verification portion that verifies that the trust assignment identifier is assigned to the public key within the response message.

4. The e-mail transfer device as claimed in claim 3, wherein the trigger message trust assignment portion adds an electronic signature of the e-mail transfer device for the public key of the e-mail transfer device to a public key certificate portion which is blank within the trigger message, and add an electronic signature of the e-mail transfer device for the public key of the e-mail reception device to a public key certificate portion which is blank within the response message.

5. The e-mail transfer device as claimed in claim 4, further comprising a portion that inserts into the message a public key certificate of a destination e-mail transfer device into which the public key of the e-mail transmission device is inserted when a destination of the message is another e-mail transfer device mutually authenticated.

6. The e-mail transfer device as claimed in claim 3, wherein the e-mail transmission device and the e-mail reception device add a same message identifier which is unique within a network to each message.

7. The e-mail transfer device as claimed in claim 3, wherein the trigger message trust assignment portion adds the trust assignment identifier to a header portion of the trigger message, and the response message trust assignment portion adds the trust assignment identifier to a header portion of the response message.

8. The e-mail transfer device as claimed in claim 3, wherein the trigger message trust assignment portion transmits a trust assignment identifier together with the trigger message, and the response message trust assignment portion transmits the trust assignment identifier together with the response message.

9. The e-mail transfer device as claimed in claim 3, wherein when a trigger message including a public key of the e-mail transmission device and plaintext requesting the e-mail reception device to transmit an encoded and electronically signed mail is received from the e-mail transmission device, the trust assignment identifier is assigned to the public key of the trigger message to be transmitted to the e-mail reception device, and when a response message including a public key of the e-mail reception device and an encoded and electronically signed message is received from the e-mail reception device, the trust assignment identifier is assigned to the response message to be transmitted to the e-mail transmission device.

10. The e-mail transfer device as claimed in claim 3, wherein the e-mail transmission device and the e-mail reception device respectively have a storage portion that stores a public key of the other device together with its identifier and a portion that substitutes the identifier for the public key when transmitting each message after storing the public key and the identifier in the storage portion.

11. The e-mail transfer device as claimed in claim 3, further comprising a validity determination portion that determines whether or not the trigger message or the response message is valid;

the trigger message trust assignment portion returning to the e-mail transmission device an invalid trigger message in which a header portion of the trigger message is changed when the validity determination portion determines that the trigger message is not valid, and the response message trust assignment portion returning an invalid response message in which a header portion of the response message is changed to the e-mail reception device when the validity determination portion determines that the response message is not valid.

12. An e-mail transfer device for transferring an e-mail by a public key encoding method between an e-mail transmission device and an e-mail reception device comprising:

a trigger message receiver that receives from the e-mail transmission device a trigger message to which user authentication data and a public key are added;

a user authentication portion that authenticates the user authentication data;

a trigger message trust assignment portion that assigns a trust assignment identifier to the public key within the trigger message to be transmitted to the e-mail reception device and triggering a response message to be transmitted by the e-mail reception device when the user authentication data within the trigger message are authenticated by the user authentication portion;

a response message receiver that receives from the e-mail reception device the response message to which user authentication data and a public key are added; and a response message trust assignment portion that assigns a trust assignment identifier to the public key within the response message to be transmitted to the e-mail transmission device and triggers the e-mail to be transmitted to the e-mail reception device by the e-mail transmission device when the user authentication data within the response message are authenticated by the user authentication portion, wherein the e-mail reception device has a trigger message acquisition portion that acquires the trigger message from the e-mail transfer device, a trigger message trust assignment verification portion that verifies whether or not the trust assignment identifier is assigned to the public key within the trigger message, a response message transmitter that transmits the response message to the e-mail transfer device when the trigger message trust assignment verification portion that verifies that the trust assignment identifier is assigned to the public key within the trigger message, and a mail receiver that decodes an e-mail from the e-mail transmission device with a private key of the e-mail reception device itself, and further decoding the electronic signature with a public key of the e-mail transmission device.

13. The e-mail transfer device as claimed in claim 3, wherein the e-mail transmission device transmits to the e-mail reception device an e-mail electronically signed with a private key of the e-mail transmission device and encoded with the public key of the e-mail reception device assigned with the trust assignment identifier of the e-mail transfer device, and the e-mail reception device decodes the encoded e-mail with a private key of the e-mail reception device and checks the electronic signature of the decoded e-mail with the public key of the e-mail transmission device having verified that the trust assignment identifier is assigned.

14. The e-mail transfer device as claimed in claim 3 or 12, wherein the e-mail transmission device and the e-mail reception device are provided with a message preparing user interface having a message preparing screen for designating a message, or a message management interface having a message state display screen for displaying a message state.

15. The e-mail transfer device as claimed in claim 12, wherein when a trigger message including a public key of the e-mail transmission device and plaintext requesting the e-mail reception device to transmit an encoded and electronically signed mail is received from the e-mail transmission device, the trust assignment identifier is assigned to the public key of the trigger message to be transmitted to the e-mail reception device, and when a response message including a public key of the e-mail reception device and an encoded and electronically signed message is received from the e-mail reception device, the trust assignment identifier is assigned to the response message to be transmitted to the e-mail transmission device.

16. The e-mail transfer device as claimed in claim 12, wherein the e-mail transmission device and the e-mail reception device respectively have a storage portion that stores a public key of the other device together with its identifier and a portion that substitutes the identifier for the public key when transmitting each message after storing the public key and the identifier in the storage portion.

17. The e-mail transfer device as claimed in claim 12, further comprising a validity determination portion that determines whether or not the trigger message or the response message is valid;
the trigger message trust assignment portion returning to the e-mail transmission device an invalid trigger message in which a header portion of the trigger message is changed when the validity determination portion determines that the trigger message is not valid, and the response message trust assignment portion returning an invalid response message in which a header portion of the response message is changed to the e-mail reception device when the validity determination portion determines that the response message is not valid.

18. The e-mail transfer device as claimed in claim 12, wherein the e-mail transmission device transmits to the e-mail reception device an e-mail electronically signed with a private key of the e-mail transmission device and encoded with the public key of the e-mail reception device assigned with the trust assignment identifier of the e-mail transfer device, and the e-mail reception device decodes the encoded e-mail with a private key of the e-mail reception device and checks the electronic signature of the decoded e-mail with the public key of the e-mail transmission device having verified that the trust assignment identifier is assigned.

19. An e-mail transfer method of an e-mail transfer device for transferring an e-mail by a public key encoding method between an e-mail transmission device and an e-mail reception device comprising:
receiving from the e-mail transmission device a trigger message to which user authentication data and a public key are added;
authenticating the user authentication data;
assigning a trust assignment identifier to the public key within the trigger message to be transmitted to the e-mail reception device and triggering a response message to be transmitted by the e-mail reception device when the user authentication data within the trigger message are authenticated by the authenticating;
receiving from the e-mail reception device the response message to which user authentication data and a public key are added; and
assigning a trust assignment identifier to the public key within the response message to be transmitted to the e-mail transmission device and triggering the e-mail to be transmitted to the e-mail reception device by the e-mail transmission device when the user authentication data within the response message are authenticated by the authenticating, wherein
the e-mail reception device acquires the trigger message from the e-mail transfer device, verifies whether or not the trust assignment identifier is assigned to the public key within the trigger message, transmits the response message to the e-mail transfer device when it is verified that the trust assignment identifier is assigned to the public key within the trigger message, and decodes an e-mail from the e-mail transmission device with a private key of the e-mail reception device itself, and further decodes the electronic signature with a public key of the e-mail transmission device.

* * * * *